(12) United States Patent
Fulmer et al.

(10) Patent No.: US 10,933,554 B2
(45) Date of Patent: Mar. 2, 2021

(54) POWER SAWS

(71) Applicant: SawStop Holding LLC, Tualatin, OR (US)

(72) Inventors: J. David Fulmer, West Linn, OR (US); Stephen F. Gass, West Linn, OR (US); John P. Nenadic, Camas, WA (US)

(73) Assignee: SawStop Holding LLC, Tualatin, OR (US)

( * ) Notice: Subject to any disclaimer, the term of this patent is extended or adjusted under 35 U.S.C. 154(b) by 87 days.

(21) Appl. No.: 15/988,907

(22) Filed: May 24, 2018

(65) Prior Publication Data

US 2018/0339422 A1 Nov. 29, 2018

Related U.S. Application Data

(60) Provisional application No. 62/511,234, filed on May 25, 2017.

(51) Int. Cl.
| | |
|---|---|
| *B27G 19/00* | (2006.01) |
| *B27G 19/02* | (2006.01) |
| *B23D 45/06* | (2006.01) |
| *B23D 47/02* | (2006.01) |
| *B23D 47/12* | (2006.01) |
| B27G 19/06 | (2006.01) |
| B27B 5/38 | (2006.01) |
| B27B 13/14 | (2006.01) |

(52) U.S. Cl.
CPC .......... *B27G 19/00* (2013.01); *B23D 45/068* (2013.01); *B23D 47/02* (2013.01); *B23D 47/12* (2013.01); *B27G 19/02* (2013.01); *B23D 47/025* (2013.01); *B27B 5/38* (2013.01); *B27B 13/14* (2013.01); *B27G 19/06* (2013.01)

(58) Field of Classification Search
CPC .......... B27B 13/14; B27B 5/38; B27G 19/00; B27G 19/02; B27G 19/06
USPC ........................................ 83/477.2
See application file for complete search history.

(56) References Cited

U.S. PATENT DOCUMENTS 1,697,669 A * 1/1929 Tautz ................ B27B 5/265
269/309
2,005,100 A * 6/1935 Merrigan ............ B23Q 1/28
108/8

(Continued)

FOREIGN PATENT DOCUMENTS

| CA | 2330872 A1 | 8/2001 |
| EP | 1110650 A1 | 6/2001 |

(Continued)

OTHER PUBLICATIONS

The INCA Woodworking Machinery Handbook—With Useful Tips and Jigs for Everyone, *INCA Maschinen*, 1984.

(Continued)

*Primary Examiner* — Ghassem Alie

(57) ABSTRACT

Power saws and features for power saws are disclosed. Various features are particularly relevant to jobsite or benchtop table saws, such as a trunnion formed from a shaped tube, an elevation carriage, and an arbor block retention mechanism. Other features are particularly relevant to table saws, hand-held circular saws, track saws, miter saws, and band saws with active injury mitigation technology, such as an electrically isolating gear and an overmolded arbor/gear element.

10 Claims, 31 Drawing Sheets

(56) References Cited

U.S. PATENT DOCUMENTS

| | | | | |
|---|---|---|---|---|
| 2,067,652 A * | 1/1937 | Tautz | ............... | B27B 5/243 83/473 |
| 2,131,492 A * | 9/1938 | Ocenasek | ............... | B27B 5/243 83/473 |
| 2,247,314 A * | 6/1941 | Sellmeyer | ............... | B27B 5/184 83/471.2 |
| 2,265,407 A * | 12/1941 | Tautz | ............... | B27B 5/243 74/32 |
| 2,465,000 A * | 3/1949 | Turner | ............... | B27B 5/265 83/473 |
| 2,515,008 A * | 7/1950 | Humphrey | ............... | B23D 59/002 83/471.2 |
| 2,590,035 A * | 3/1952 | Pollak | ............... | B27B 5/243 83/473 |
| 2,719,547 A * | 10/1955 | Gjerde | ............... | B27B 5/182 83/471.3 |
| 2,800,154 A * | 7/1957 | Ellis | ............... | B23Q 37/002 144/1.1 |
| 2,810,408 A * | 10/1957 | Boice | ............... | B27B 5/243 83/473 |
| 2,812,786 A * | 11/1957 | Hays | ............... | B27B 5/18 83/454 |
| 2,844,173 A * | 7/1958 | Gaskell | ............... | B27B 5/243 83/477.1 |
| 2,850,054 A * | 9/1958 | Eschenburg | ............... | B27B 5/243 83/473 |
| 2,873,773 A * | 2/1959 | Gaskell | ............... | B27B 5/32 83/473 |
| 2,913,025 A * | 11/1959 | Richards | ............... | B23Q 1/74 144/1.1 |
| 2,937,672 A * | 5/1960 | Gjerde | ............... | B27B 5/203 83/471.3 |
| 2,945,516 A * | 7/1960 | Edgemond, Jr. | ............... | B23Q 1/74 83/473 |
| 2,974,693 A | 3/1961 | Goldschmidt et al. | | |
| 3,013,592 A * | 12/1961 | Ambrosio | ............... | B23D 55/026 83/473 |
| 3,115,166 A | 12/1963 | Goldschmidt et al. | | |
| 3,124,178 A * | 3/1964 | Packard | ............... | B27B 5/24 83/473 |
| 3,232,326 A * | 2/1966 | Speer | ............... | B27G 19/08 83/102.1 |
| 3,280,861 A * | 10/1966 | Gjerde | ............... | B27B 5/243 83/473 |
| 3,456,697 A * | 7/1969 | Rutzebeck | ............... | B23Q 1/68 83/471.2 |
| 3,528,198 A * | 9/1970 | Klisowsky | ............... | B27B 5/205 451/129 |
| 3,538,964 A * | 11/1970 | Berends | ............... | B27B 5/243 83/473 |
| 3,604,482 A * | 9/1971 | Warrick | ............... | B23D 47/025 83/473 |
| 4,249,442 A * | 2/1981 | Fittery | ............... | B27B 5/243 83/473 |
| 4,276,799 A * | 7/1981 | Muehling | ............... | B27B 5/243 83/473 |
| 4,516,612 A | 5/1985 | Wiley | | |
| 4,581,967 A * | 4/1986 | Ehm | ............... | B23D 45/065 83/452 |
| 4,599,927 A * | 7/1986 | Eccardt | ............... | B23D 45/068 83/473 |
| 4,677,920 A | 7/1987 | Eccardt | | |
| 4,696,282 A | 9/1987 | Incitti | | |
| 4,976,251 A * | 12/1990 | Smith | ............... | B23D 47/025 125/13.01 |
| 5,009,255 A * | 4/1991 | Fournel | ............... | B23D 45/062 144/1.1 |
| 5,174,349 A | 12/1992 | Svetlik et al. | | |
| 5,224,531 A | 7/1993 | Blohm | | |
| 5,230,269 A | 7/1993 | Shiotani et al. | | |
| 5,239,906 A * | 8/1993 | Garuglieri | ............... | B23D 45/048 83/471.3 |
| 5,722,308 A | 3/1998 | Ceroll et al. | | |
| 5,857,507 A | 1/1999 | Puzio et al. | | |
| 5,875,698 A * | 3/1999 | Ceroll | ............... | B23D 45/062 144/286.5 |
| 5,979,523 A | 11/1999 | Puzio et al. | | |
| 6,131,629 A | 10/2000 | Puzio et al. | | |
| 6,283,002 B1 * | 9/2001 | Chiang | ............... | B23D 45/067 83/477.1 |
| 6,293,176 B1 | 9/2001 | Talesky | | |
| 6,530,303 B1 | 3/2003 | Parks et al. | | |
| 6,722,242 B2 | 4/2004 | Chuang | | |
| 6,820,524 B1 * | 11/2004 | Ceroll | ............... | B23D 45/062 83/13 |
| 6,932,075 B1 * | 8/2005 | Tsao | ............... | B27B 5/24 125/13.01 |
| 6,942,229 B2 * | 9/2005 | Brazell | ............... | B25H 1/04 108/119 |
| 6,986,370 B1 | 1/2006 | Schoene et al. | | |
| 6,994,004 B2 * | 2/2006 | Gass | ............... | B27B 5/38 83/477.1 |
| 7,036,414 B2 | 5/2006 | Behne et al. | | |
| 7,219,585 B1 * | 5/2007 | Kelly | ............... | B23D 45/021 125/13.01 |
| 7,320,270 B2 * | 1/2008 | Liu | ............... | B23D 45/067 83/471.3 |
| 7,350,444 B2 | 4/2008 | Gass et al. | | |
| 7,472,634 B2 * | 1/2009 | Gass | ............... | B27G 19/02 83/471.3 |
| 7,587,967 B2 * | 9/2009 | Bauer | ............... | B27B 5/243 83/473 |
| 7,707,920 B2 | 5/2010 | Gass et al. | | |
| 7,789,002 B2 * | 9/2010 | Gass | ............... | B23D 47/08 83/477.2 |
| 7,827,893 B2 | 11/2010 | Gass et al. | | |
| 7,950,317 B2 * | 5/2011 | Parks | ............... | B23D 45/048 83/467.1 |
| 7,984,735 B1 * | 7/2011 | Hayes | ............... | B23D 47/12 144/363 |
| 7,992,480 B2 * | 8/2011 | Yu | ............... | B23D 59/002 83/471.3 |
| 8,584,564 B2 * | 11/2013 | Welsh | ............... | B23D 47/025 83/477.2 |
| 8,601,926 B2 * | 12/2013 | Frolov | ............... | B23D 45/068 83/471.2 |
| 9,555,491 B2 | 1/2017 | Gass et al. | | |
| 9,651,277 B2 * | 5/2017 | Hansen | ............... | F24S 20/30 |
| 9,687,922 B2 * | 6/2017 | Szweda | ............... | B23D 47/08 |
| 9,724,840 B2 * | 8/2017 | Gass | ............... | B23D 59/001 |
| 9,844,891 B2 | 12/2017 | Gass et al. | | |
| 9,868,166 B2 * | 1/2018 | Hendrickson | ............... | B23D 59/002 |
| 9,956,626 B2 * | 5/2018 | Wang | ............... | B23D 59/006 |
| 2002/0096030 A1 | 7/2002 | Wang | ............... | B23D 45/067 83/477.1 |
| 2004/0226800 A1 | 11/2004 | Pierga et al. | | |
| 2005/0217446 A1 * | 10/2005 | Brazell | ............... | B23D 47/025 83/477.2 |
| 2006/0075943 A1 * | 4/2006 | Chen | ............... | B25H 1/04 108/115 |
| 2006/0201296 A1 | 9/2006 | Kuo | | |
| 2006/0201302 A1 | 9/2006 | Schwaiger et al. | | |
| 2009/0165624 A1 | 7/2009 | Brown et al. | | |
| 2010/0005939 A1 | 1/2010 | Burke et al. | | |
| 2010/0050843 A1 * | 3/2010 | Gass | ............... | B23D 47/12 83/477.1 |
| 2010/0132527 A1 * | 6/2010 | Liu | ............... | B23D 45/068 83/477.1 |
| 2011/0041667 A1 | 2/2011 | Chiang | | |
| 2011/0067540 A1 * | 3/2011 | Frolov | ............... | B23D 47/025 83/467.1 |
| 2011/0072950 A1 | 3/2011 | Iannelli, Sr. | | |
| 2011/0146470 A1 | 6/2011 | Lin | | |
| 2012/0006171 A1 | 1/2012 | Liu | | |
| 2012/0204688 A1 | 8/2012 | Rowe | | |
| 2014/0260869 A1 | 9/2014 | Frolov | | |
| 2015/0108418 A1 * | 4/2015 | Chang | ............... | B27B 5/10 254/418 |

(56) References Cited

U.S. PATENT DOCUMENTS

| | | | |
|---|---|---|---|
| 2016/0271710 | A9 | 9/2016 | Gass et al. |
| 2016/0346849 | A1* | 12/2016 | Gass .................. B23D 45/062 |
| 2017/0008189 | A9 | 1/2017 | Gass et al. |

FOREIGN PATENT DOCUMENTS

| | | |
|---|---|---|
| WO | WO 10/059786 A1 | 5/2010 |
| WO | WO 01/26064 A2 | 4/2011 |
| WO | WO 17/210091 A1 | 12/2017 |

OTHER PUBLICATIONS

SI16WA-WF Circular Saw with Tilting Blade Spare Parts Catalogue, SCMI Corporation, Norcross, GA, Nov. 1986 and 1991.
Whirlwind Model 212 Cut-Off Saw Owner's Manual, Whirlwind, Inc., Apr. 1991.
Inca 2100SE Professional Tablesaw Owners Manual, Injecta Machinery, 1992.
Inca 2200 Table Saw Photo of Internal Mechanisms, around 1992.
Whirlwind Model 212 Semi-Automatic Cut-Off Saw Brochure, Whirlwind, Inc., Jan. 1993.
Skil Model 3400-Type 1 10" Table Saw Parts List and Technical Bulletin, S-B Power Tool Company, Jun. 1993.
Active Safety System on a Table Saw, Jan Nieberle & Sebastian Hauer, 1997 Workplace Bavaria.
Elmshorn Student Wins for the Seconds Time at Jugend Forscht, Hamburg Morning News, May 5, 1997.
SC 3W Circular Saw Manual, SCM Group S.p.A. Divisione Minimax—Samco, Feb. 2001.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
Altendorf publication, Wilhelm Altendorf GmbH & Co. KG, Minden, Germany, 1999.
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
Ryobi 10" Table Saw BT3000 Operator's Manual, Ryobi Technologies, Inc., Mar. 2001.
SI450E Circular with Tilting Blade Spare Parts Catalogue, SCM, Apr. 26, 2001.
Bosch 10" Table Saw Model 0601476139 Parts List and Technical Bulletin, S-B Power Tool Company, Apr. 2001.
Rojek Circular Saw PK 300 Spare part catalogue, Apr. 14, 2003.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Grizzly Industrial, Inc. Heavy-Duty 12" Table Saw Model G5959 and G9957 Parts List, 1998 and Oct. 2001.
Ryobi 10" Table Saw BT3100 Operator's Manual, Ryobi Technologies, Inc., Aug. 2002.
Rojek KPF 300A-xxxx-RN-1P3 Table Saw/Shaper Combination Machine specification sheet, Sep. 30, 2002.
Laguna Tools Signature Series by Knapp, Oct. 21, 2002.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
U.S. Appl. No. 61/892,231, filed Oct. 17, 2013, Gass et al.
U.S. Appl. No. 61/892,237, filed Oct. 17, 2013, Gass et al.
U.S. Appl. No. 61/892,246, filed Oct. 17, 2013, Gass et al.
U.S. Appl. No. 61/898,964, filed Nov. 1, 2013, Gass et al.
Grizzly Industrial, Inc. Model G0605X/G0606X Extreme Series 12" Table Saw Owner's Manual, Grizzly Industrial, Inc., Oct. 2006.
SI300S-SI300S4 Circular with Tilting Blade Spare Parts Catalogue, SCM, Oct. 30, 2003.
Craftsman® Power and Hand Tools, pp. 142-143, 2003.
The Legendary Shopsmith Mark V ad, Shopsmith, Inc., at least as early as Jan. 14, 2004.
Makita Model 2704 Exploded Drawings and Parts List, Nov. 2005.
Powermatic WMH Tool Group Operating Instructions and Parts Manual 10-inch Cabinet Saw Model 2000, Nov. 2005.
Porter-Cable 10" Portable Table Saw 3812, Porter-Cable Corporation, 2005.
Porter Cable 10" Portable Table Saw Model 3812 Parts List with Guard Exploded View, 2005.
DW745 Type 1 Table Saw Parts List, DeWalt Industrial Tool Co., 2005.
C10RB Jobsite Table Saw Manual, Hitachi Koki USA Ltd., 2006.
DW745 Heavy-Duty 10" Job Site Table Saw Manual, DeWalt Industrial Tool Co., 2006.
JET XACTA Saw Deluxe Operating Instructions and Parts Manual, JET/Walter Meier Manufacturing Inc., Dec. 2009.
TS 250 Manual, Metabo, 2007.
TS 250 Circular Saw Parts List, Metabo, 2007.
Bosch 4100 Table Saw Parts List, Robert Bosch Tool Corporation, Feb. 14, 2008.
Grizzly Industrial, Inc. Model G0651/G0652 10" Extreme Series Table Saws Owner's Manual, Grizzly Industrial, Inc., Mar. 2008.
Bosch 4100 Table Saw Manual, Robert Bosch Tool Corporation, May 2008.
SawStop 10" Industrial Cabinet Saw Owner's Manual, SawStop, LLC, Oct. 2008.
General Model 50-300/305 MI, 50-300CE/305CE Setup and Operation Manual, General International, Jul. 2009.
Table Saw Face-Off,Hurst-Wajszczuk, Woodcraft Magazine, Oct./Nov. 2009.
SawStop 10" Contractor Saw Owner's Manual, SawStop, LLC, May 2010.
Delta 10" Left Tilting Unisaw Instruction Manual, Delta Machinery, 2009, 2010.
General Model 502-70 Setup and Operation Manual, General International, Mar. 2010.
General Model 50-200R Setup and Operation Manual, General International, Sep. 2010.
Delta UNISAW Accessories, Delta Power Equipment Corporation, Mar. 1, 2012.
SawStop Model PCS175 10" Professional Cabinet Saw Owner's Manual, SawStop, LLC, Nov. 2012.
DEWALT Models DWE7490, DWE7491 Instruction Manual, DeWALT Industrial Tool Co., 2013.

\* cited by examiner

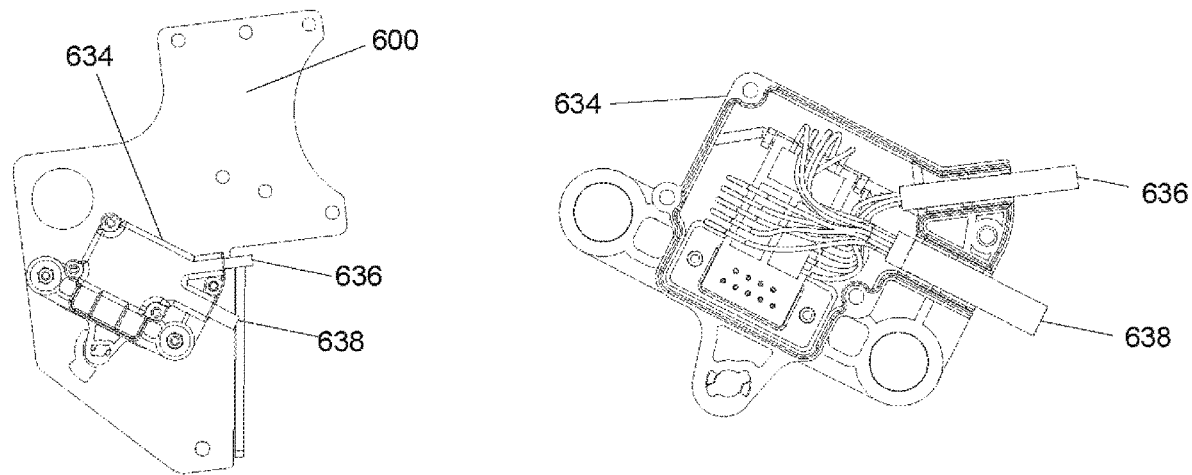
Fig. 42
Fig. 43
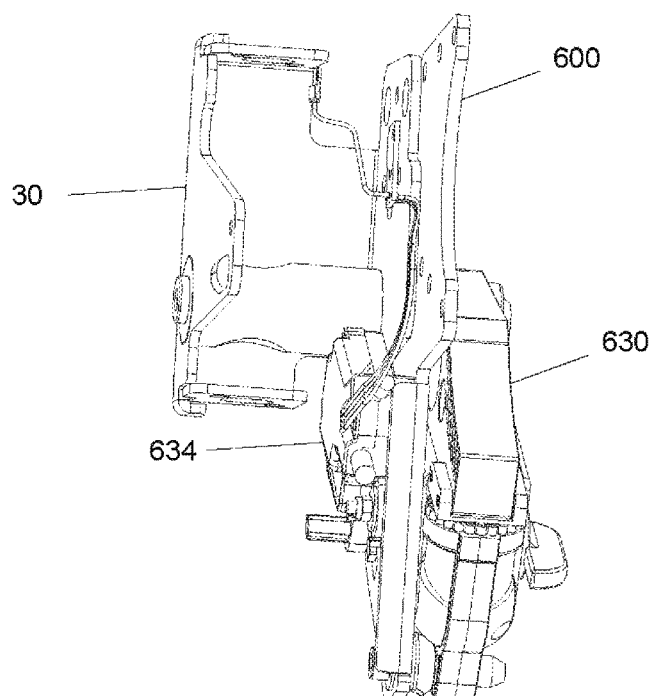
Fig. 44

POWER SAWS

CONTINUATION

This application claims the benefit of and priority from U.S. Provisional Patent Application Ser. No. 62/511,234, filed May 25, 2017, which is incorporated herein by reference.

FIELD

The present disclosure relates to power saws and features that may be implemented in power saws. Various disclosed features are particularly relevant to portable table saws sometimes called jobsite or benchtop saws. Various other disclosed features are particularly relevant to table saws, hand-held circular saws, track saws, miter saws, and band saws with active injury mitigation technology.

BACKGROUND

A power saw is a tool used to cut a workpiece, such as a piece of wood, to a desired size or shape. Table saws, hand-held circular saws, track saws, miter saws, and band saws are examples of power saws. A table saw includes a work surface or table and a circular blade extending up through the table. A person uses a table saw by placing a workpiece on the table and feeding it into contact with the spinning blade to cut the workpiece to a desired size. A hand-held circular saw includes a circular blade, motor and handle. A person uses a hand-held circular saw by grasping the handle and moving the spinning blade into contact with a workpiece. A track saw is similar to a hand-held circular saw, and includes a track to guide the movement of the saw as the blade cuts the workpiece. A miter saw includes a circular blade on a moveable support arm. A person uses a miter saw by placing a workpiece under the blade and then moving the blade into contact with the workpiece to make a cut, typically by pivoting the blade and support arm down. A band saw includes a work surface and an adjacent band blade driven around two or more rollers or wheels. A person uses a band saw by placing a workpiece on the work surface and moving the workpiece into contact with the band blade.

Power saws are some of the most basic and versatile machines used in woodworking and construction. For example, power saws are used in making furniture and cabinetry, in the installation of hardwood flooring, in cutting plywood panels for roofing and walls, in cutting material for countertops, in making pallets and crates, and for many other projects and tasks.

Each type of power saw comes in various sizes and configurations. For example, table saws come in sizes ranging from large, stationary, industrial table saws, to small, lightweight, portable table saws. Larger table saws are sometimes called cabinet saws, mid-sized table saws are sometimes called contractor saws or hybrid saws, and smaller table saws are sometimes called portable, jobsite, or benchtop table saws. The larger table saws include induction motors and cast-iron parts, and typically weigh well over 100 pounds. The smaller, portable table saws are often small and light enough to be transported in the back of a pickup truck, and they often have stands with wheels so they can be moved around a jobsite or workspace. The smaller table saws have universal motors and weigh less than 100 pounds. For example, jobsite saws weigh approximately 60 to 80 pounds, and the smallest benchtop saws weigh approximately 40 to 45 pounds.

Hand-held circular saws, track saws, miter saws and band saws also come in various sizes and configurations, and they can be equipped with different features.

The names "table saws," "hand-held circular saws," "track saws," "miter saws," and "band saws" are general categories that can overlap. For example, a track saw is a type of hand-held circular saw and can be referred to as a hand-held circular saw. Miter saws and band saws have tables or work surfaces on which a workpiece is placed to make a cut, and in that regard are similar to a table saw. Nevertheless, the designations "table saws," "hand-held circular saws," "track saws," "miter saws," and "band saws" are generally understood by persons of ordinary skill in the art of woodworking and construction to identify different categories or types of power saws.

Power saws present potential dangers or hazards because of the moving blade. Numerous accidents occur where a person using a power saw accidentally comes into contact with the moving blade. To address this issue, power saws can be equipped with active injury mitigation technology. Active injury mitigation technology detects a dangerous condition, such as accidental contact with the moving blade by a person, and then performs some action to mitigate injury, such as stopping or retracting the blade in milliseconds. Generally, an embodiment of active injury mitigation technology includes at least a detection system to detect the dangerous condition and a reaction system to perform the action to mitigate injury. An embodiment of active injury mitigation technology might also include a control system to control and/or test operation of the detection and reaction systems. The terms "detection system," "reaction system" and "control system" are used to identify known categories of structural components, and therefore, identify structure rather than function, just as the terms "actuator" and "sensor" identify known categories of structural components. For example, the term "detection system" is known to describe structural elements such as electronic circuitry to generate and monitor an electrical signal. The term "reaction system" is known to describe structural elements such as brake mechanisms and retraction mechanisms. The term "control system" is known to describe structural elements such as electronic circuitry and controllers used to manage, control and/or test the operability of the detection and reaction systems. U.S. patent application Ser. No. 10/100,211, filed Mar. 13, 2002 and titled "Safety Systems for Power Equipment," which issued as U.S. Pat. No. 9,724,840 on Aug. 8, 2017, describes active injury mitigation technology and various implementations and embodiments of active injury mitigation technology in power saws. The entire disclosure of U.S. patent application Ser. No. 10/100,211, and the patent resulting from that application, are incorporated herein by reference.

This document describes power saws and features that may be implemented in various categories of power saws. Some of the features described are particularly relevant to portable table saws such as jobsite and benchtop table saws. Other features described are particularly relevant to power saws with active injury mitigation technology.

BRIEF DESCRIPTION OF THE DRAWINGS

FIG. 42 shows a brake cartridge cable housing and brake cartridge alignment bracket isolated.

FIG. 43 shows another view of the brake cartridge cable housing of the table saw of FIG. 42 isolated.

FIG. 44 shows an elevation carriage with a brake cartridge bracket and a brake cartridge.

DETAILED DESCRIPTION

Figure 1:
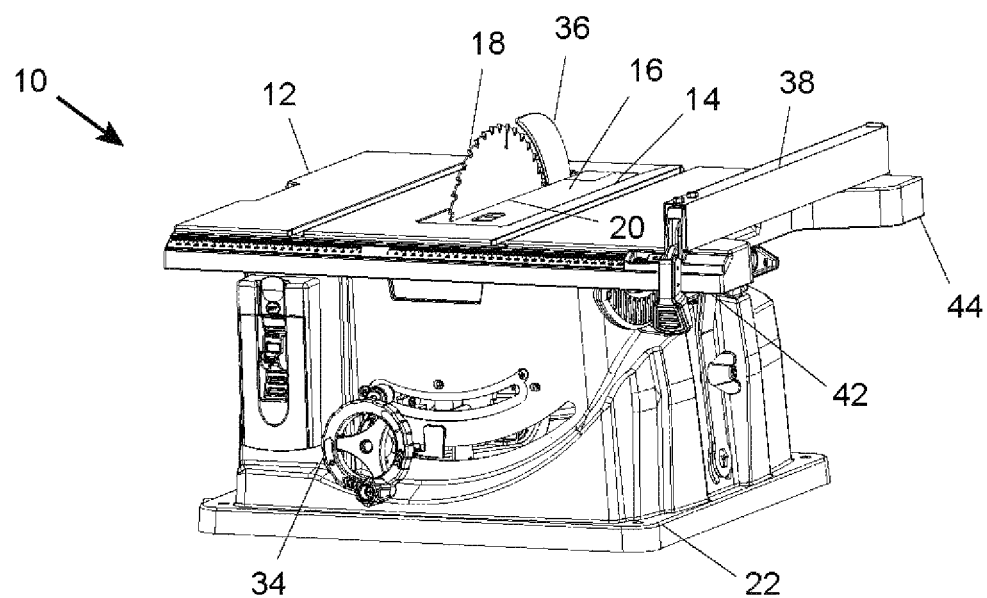
FIG. 1 shows a portable table saw.

FIG. 1 shows a table saw 10. The table saw includes a table 12 with an opening 14 and an insert 16 in the opening.

Figure 2:
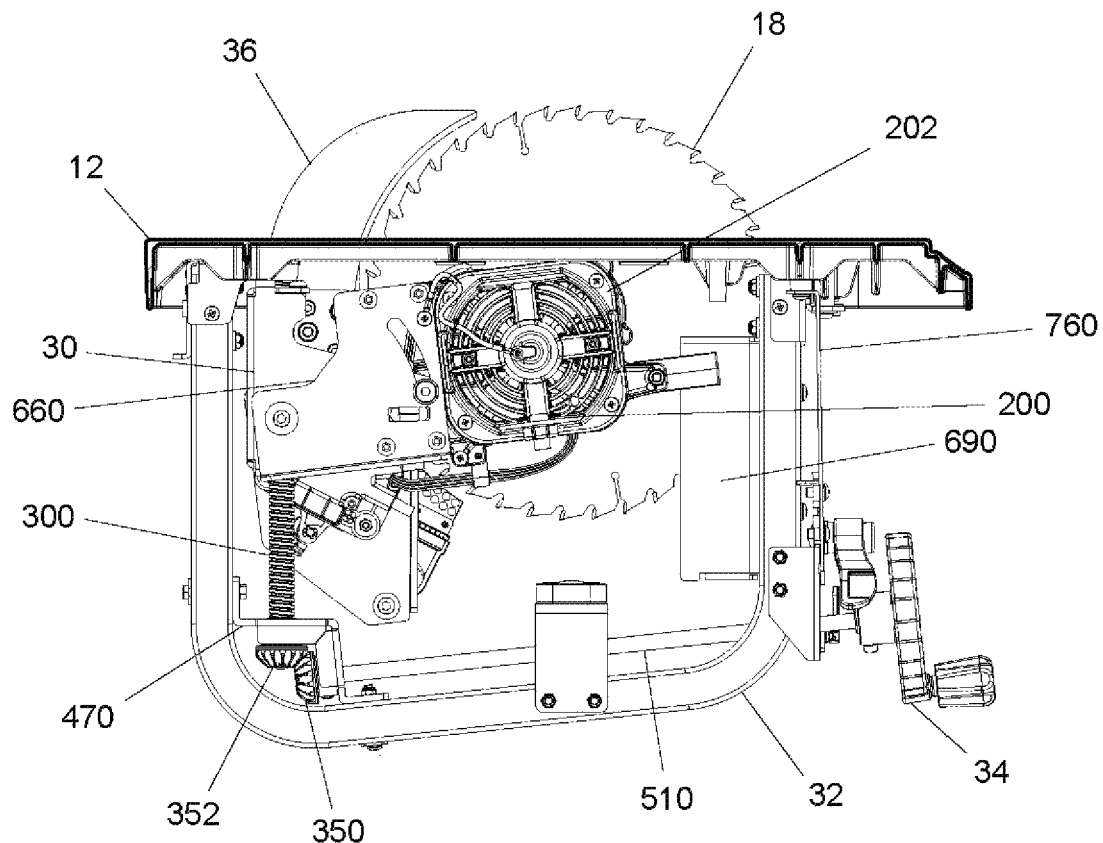
FIG. 2 shows an internal side view of the table saw of FIG. 1 with the housing removed.

A blade 18 extends up through a slot 20 in the insert. A housing 22 supports the table and a motor is within the housing. The motor 200, shown in FIG. 2, is operably connected to the blade to drive or spin the blade. To use the table saw, a user places a workpiece on the table and slides it into contact with the spinning blade to make a cut.

Table saws such as saw 10 can be equipped with "active injury mitigation technology." That phrase refers to technology that detects a dangerous condition, such as contact between a person and the spinning blade, and then performs some predetermined action to mitigate any injury, such as stopping and/or retracting the blade. Exemplary implementations of active injury mitigation technology are described in International Patent Application Publication No. WO 01/26064 A2, in U.S. patent application Ser. No. 10/100,211, filed Mar. 13, 2002, titled "Safety Systems for Power Equipment," and in U.S. Pat. No. 9,724,840 issuing from U.S. patent application Ser. No. 10/100,211, all of which are incorporated herein by reference.

The blade in a table saw is typically supported in such a way that a user can change the elevation and tilt of the blade relative to the work surface or table to cut material of various thicknesses and to make angled cuts. FIG. 2 is an internal side view of table saw 10 with housing 22 and other structures removed. FIG. 2 shows blade 18 supported by an elevation carriage 30, which in turn is supported by a trunnion 32 hanging from table 12. The elevation carriage moves up and down relative to the trunnion to change the elevation of the blade relative to the table, or relative to the work surface on the table, and the elevation carriage and trunnion tilt or pivot from side to side to change the angle of the blade relative to the table or work surface.

In some table saws, the elevation of the blade is changed by turning a hand wheel, such as hand wheel 34 in FIG. 1. Typically, the hand wheel is connected to a shaft which turns bevel gears to raise and lower the elevation carriage as shown in FIG. 2, or alternatively, the hand wheel turns a screw that pivots the elevation carriage up and down. Other table saws use a lever or other mechanism to raise and lower the blade. Tilting the blade is accomplished in some table saws by turning a second hand wheel or a lever, and in other table saws by releasing a clamp and moving the elevation hand wheel to the side, as shown in FIG. 2. The specific elevation and tilt mechanisms shown in FIG. 2 are discussed in more detail below.

Figure 3:
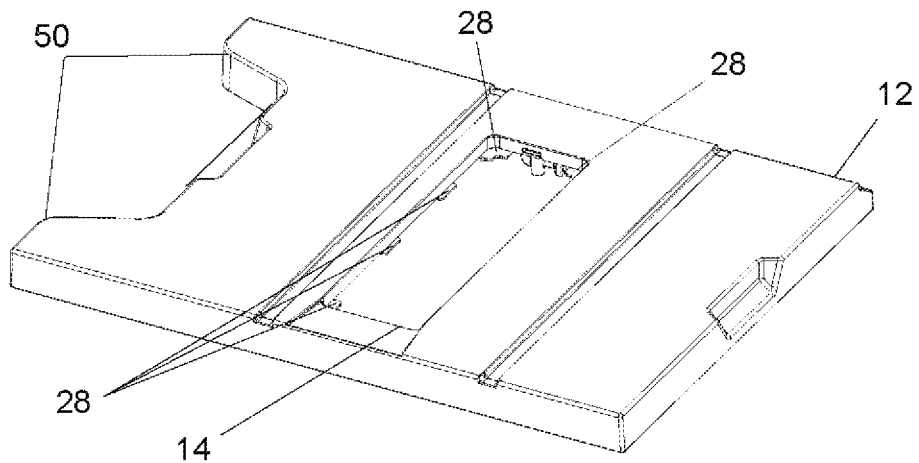
FIG. 3 shows an isometric view of the top of the table of the table saw in FIG. 1 isolated.
Figure 4:
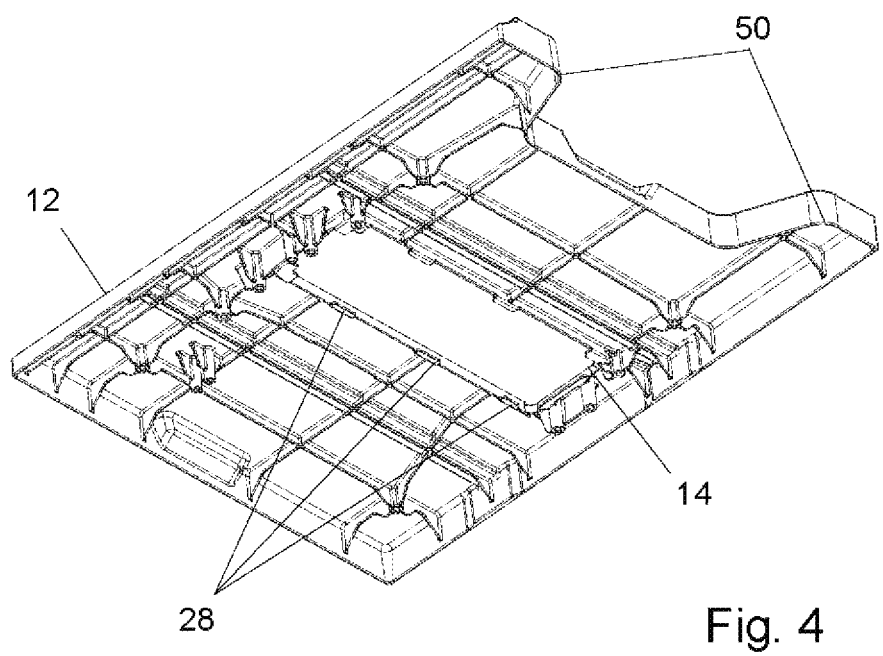
FIG. 4 shows an isometric view of the bottom of the table of FIG. 3.

Table 12 is shown isolated in FIGS. 3 and 4. The table is made from die cast aluminum with ribs on the bottom side, shown in FIG. 4, to add strength and rigidity while minimizing weight and manufacturing costs. It will be appreciated that table 12 could be made from other materials or by other methods. Table 12 has two extensions 50 which allow a fence 38 to have an increased lateral range, thus increasing the saw's rip capacity, while keeping the saw lightweight.

Figure 5:
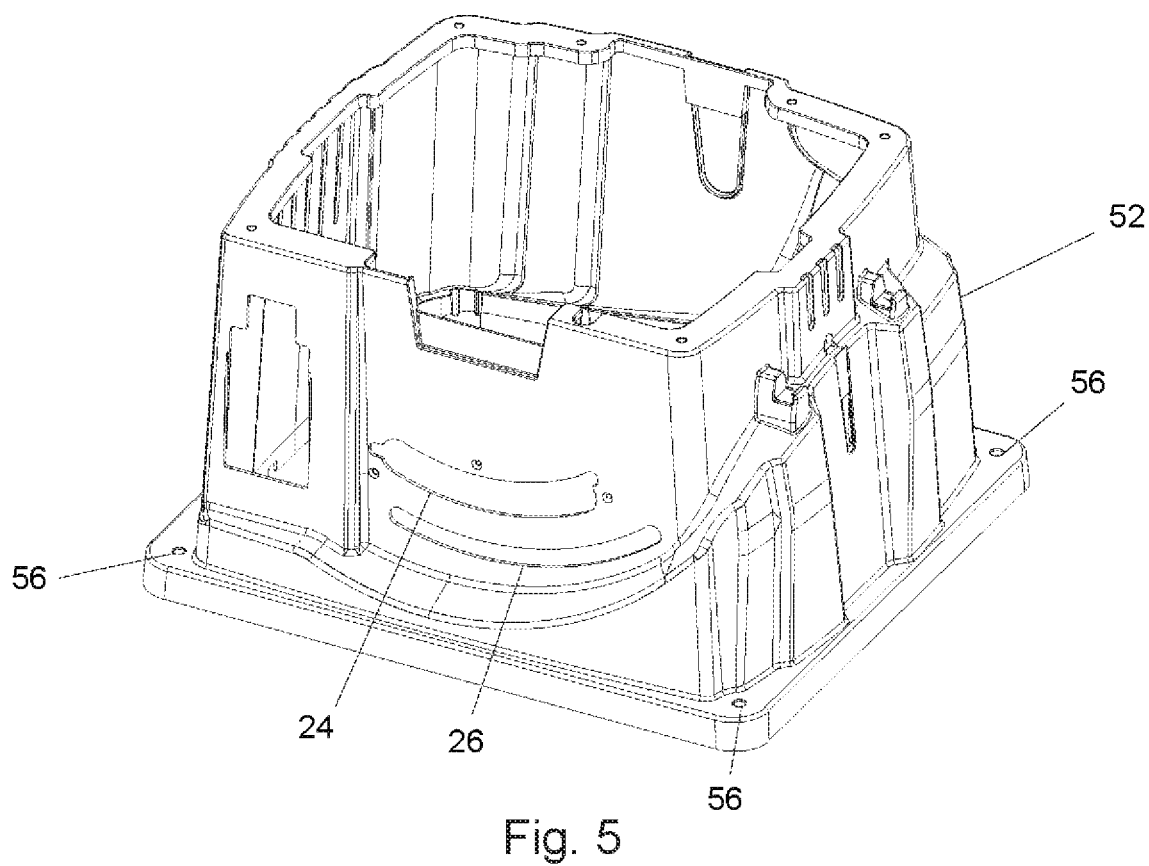
FIG. 5 shows the housing of the table saw of FIG. 1 isolated.
Figure 6:
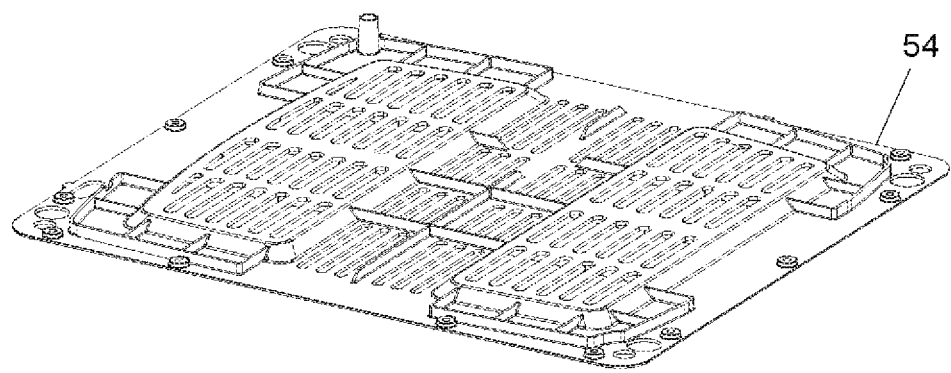
FIG. 6 shows the bottom component of the housing of the table saw of FIG. 1 isolated.

Housing 22 includes a main body 52 and a base 54 attached to the main body (shown in FIGS. 5 and 6, respectively). The base is formed with ribs and openings in what may be thought of as a honeycomb pattern. The ribs are close enough to prevent a user from reaching into the interior of the saw, and the openings between the ribs allow sawdust to fall through. The height and size of different ribs can be varied to provide clearance for internal components of the saw. In the depicted embodiment, the base is injection molded out of plastic, although it will be appreciated that other materials and methods could be used.

Base 54 can be joined to the main body 52 to form housing 22 in various ways. In the depicted embodiment, the base is screwed to the main body, and the base and main body include screw holes and bosses for the screws. Main body 52 can also include sockets that can be used to clamp or mount the saw to a cart, stand, or benchtop, such as sockets 56 shown in FIG. 5.

Inserts used in table saws typically lock in place in the blade opening so that the blade does not kick the insert back toward the user if the blade contacts the insert. Locking the insert into place also prevents the insert from popping up and presenting an edge that might catch a workpiece as the workpiece moves toward the blade. In saws with active injury mitigation systems, particularly those in which the system monitors an electrical signal for changes indicative of contact between a user and the blade, the throat plate is typically made of, or coated with, non-conductive material.

An insert fits into an opening in a table. The opening is sometimes called a "throat" or "blade opening" and the insert is sometimes called a "throat plate." The opening is typically large enough for a user to perform some types of service or maintenance to the saw through the opening, such as changing the blade. An opening in the table around the blade, however, means the table cannot support a workpiece next to the blade, so the insert is placed in the opening around the blade to support a workpiece adjacent the blade. As seen in FIG. 1, insert 16 fits in opening 14 in table 12. The insert includes a slot or channel 20 through which the blade extends. The insert is removable so a user can access internal components of the saw through the blade opening (for example, a user can remove the insert to change the blade, to access the mount for a riving knife or spreader, or to change out a cartridge used in an active injury mitigation system). In the depicted exemplary embodiment, insert 16 and corresponding opening 14 are generally rectangular in shape. This allows the throat plate opening to extend closer to the edges of the table, thus increasing the capacity of the hole and the accessibility of the internal components of the saw.

Opening 14 has eight support tabs, or ledges, 28, which are shown in FIGS. 3 and 4. The support tabs 28 extend a short way into opening 14 from the underside of the table, and support insert 16 when the insert is placed within the opening. The rear of the insert can be held down and/or locked into place in many ways. In the depicted embodiment, tabs 112 (labeled in FIG. 7) extend from the rear of insert 16 and fit under a corresponding ledge on table 12. The front of insert 16 is held in place by a sliding lock member actuated by a lever or tab.

Figure 7:
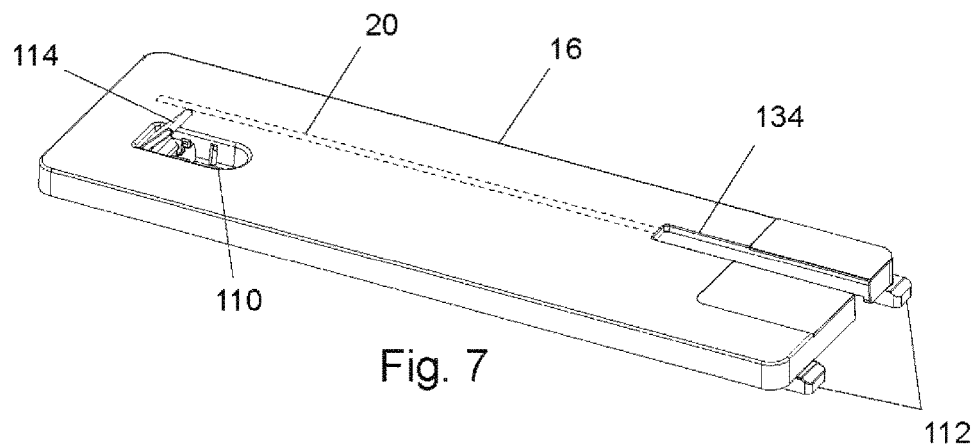
FIG. 7 shows the table insert and accompanying hold-down mechanism of the table saw of FIG. 1 isolated.

FIGS. 7 through 10 show a mechanism to hold down the front of an insert that is simple to operate and that does not require a tool to install, lock, unlock, or remove. FIG. 7 shows the top of insert 16 with the hold-down mechanism installed therein. The insert includes an opening or indentation 110 sized to accommodate both the hold-down mechanism and a user's finger. In the depicted embodiment, a finger lever 114 is configured to be pulled toward the front of the saw to release the insert from the blade opening because pulling the lever in that direction is a convenient, intuitive movement when a finger is inserted into indentation 110. Finger lever 114 is shown actuated (angled up) in FIG. 7, and un-actuated (generally horizontal) in FIGS. 8, 9, and 10. An additional benefit of the configuration of finger lever 114 is that, should a user forget to press the lever back down to lock the insert in place, a piece of wood or other material to be cut would pass across finger lever 114 and push it down into the un-actuated, locked position.

Figure 8:
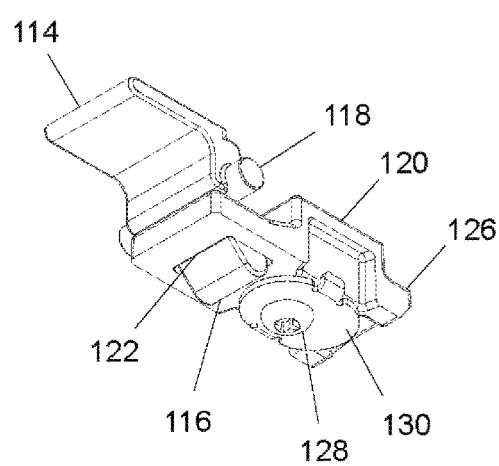
FIG. 8 shows an isometric bottom view of the hold-down mechanism of FIG. 7 isolated.
Figure 9:
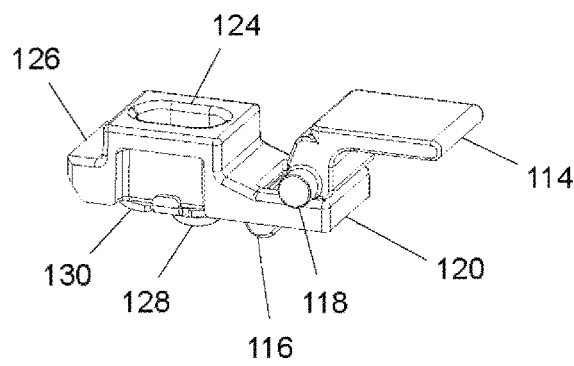
FIG. 9 shows an isometric top view of the hold-down mechanism of FIG. 7 isolated.
Figure 10:
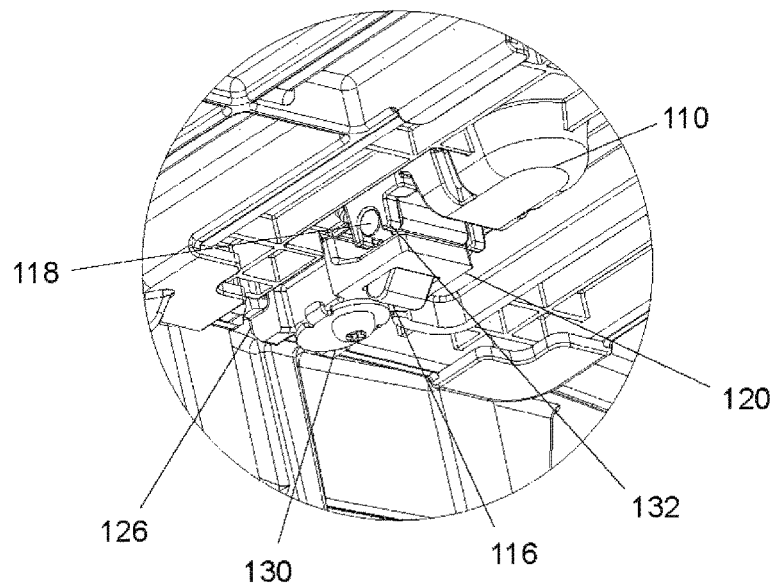
FIG. 10 shows a detail view of the table insert and hold-down mechanism installed in the table saw of FIG. 1.

FIGS. 8 and 9 show the hold-down mechanism isolated from insert 16. Finger lever 114 bends down and becomes lock lever 116, and a dowel portion 118 is interposed between lever portions 114 and 116. Lock lever 116 fits into a generally rectangular opening 122 in lock block 120. Lock block 120 is connected to the bottom of insert 16 by a screw 128, which passes through a washer 130 and into a portion of insert 16 which extends down into elongated opening 124 in lock block 120, as shown in FIGS. 8, 9, and 10. The downward extension of insert 16 allows for translation of lock block 120 in the forward and backward directions, but not sideways or vertically.

Dowel portion 118 fits within two sets of projections 132 extending down from insert 16, which allow dowel portion 118 to pivot, but not move forward, backward, or up. When finger lever 114 is pushed down into indentation 110, dowel portion 118 pivots within projections 132. This causes lock lever 116 to push lock block 120 towards the front of the saw until front edge 126 of said lock block 120 overlaps with a corresponding ledge on table 12, as shown in FIG. 10. This prevents the front of insert 16 from rising up during use. In order to remove the insert, a user would place a finger into indentation 110 and pull finger lever 114 up toward the front of the saw. This would cause front edge 126 to retract and cease to be in contact with table 12. The user could then lift the front of insert 16 out of opening 14, slide tabs 112 out of contact with the table and remove the insert from opening 14.

As shown in FIG. 7, insert 16 has a slot 20, shown in dashed lines, that runs from a wider opening 134 at the rear of the insert to near the front. The insert depicted in FIG. 7 is a zero-clearance insert, so slot 20 is cut by the blade, as is known in the art. Slot 20 connects with opening 134 at the rear of the slot (the rear of the slot is the portion of the slot furthest away from the front of the table saw when the insert is in the blade opening). Opening 134 allows room for a riving knife 36 or splitter to extend up through the insert, as shown in FIG. 1.

Inserts as described herein, when used in a saw having active injury mitigation technology, can be made of phenolic or wood. Both materials are non-conductive, which is preferable for active injury mitigations systems, but are relatively expensive. In the presently disclosed embodiment, insert 16 is made entirely from plastic. Alternatively, the insert could be made out of metal overmolded with plastic, but such an insert would involve extra manufacturing steps.

In an alternate exemplary embodiment, insert 16 could include screws or other features to level the insert in the blade opening and to adjust the insert so that the top surface of the insert is substantially coplanar with the top of table 12, as described in U.S. Patent Application Publication No. 2015-0107430, titled "Inserts for Table Saws," published Apr. 23, 2015 and issuing as U.S. Pat. No. 9,919,369 on Mar. 20, 2018, which is incorporated herein by reference.

A blade guard, spreader, and/or riving knife may be positioned adjacent the rear edge of the blade to shield the blade and/or to prevent a workpiece from catching the rear of the blade. FIG. 1 shows a riving knife 36, which is supported by elevation carriage 30. Riving knife 36 raises, lowers and tilts with elevation carriage 30, and therefore, maintains a constant position relative to the blade. Various mechanisms for mounting a blade guard, spreader, and/or riving knife to an elevation carriage in a table saw are described in U.S. Patent Application Publication No. 2015-0107427-A1, published Apr. 23, 2015, which is incorporated herein by reference.

Figure 11:
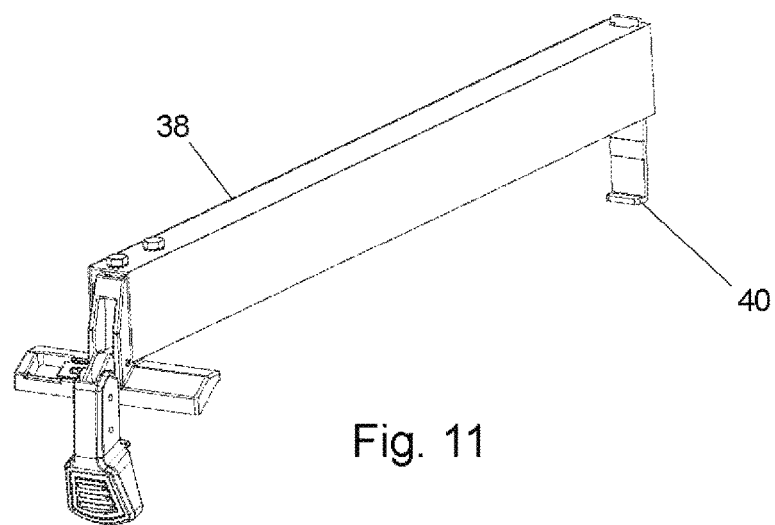
FIG. 11 shows the fence of FIG. 1 isolated.

Often, a user of a table saw guides a workpiece past the blade with a fence, such as fence 38 in FIG. 1, which is shown isolated in FIG. 11. The fence mounts to the top of the table saw and provides a fixed reference surface relative to the blade. The user can slide the workpiece against and along the fence to make a cut. The fence helps keep the workpiece moving in a straight path without shifting or rotating, and therefore, helps produce a straight cut. The fence can be secured at various positions relative to the blade so that a workpiece can be cut to different dimensions. The fence clamps to an integrally formed rail running along the front edge of table 12, such as front rail 42 in FIG. 1, shown with fence 38 in FIG. 12, and the fence can be locked or clamped anywhere along the rail. The fence may also rest on or clamp to an integrally formed rail running along the rear of the table, such as rear rail 44 in FIG. 1, shown with fence 38 in FIG. 13. In an alternate exemplary embodiment the front and rear rails 42 and 44 could be removable components, not integrally formed as part of the table. Various fences are described in U.S. Patent Application Publication No. 2015-0107428-A1, titled "Fences for Table Saws," published Apr. 23, 2015 and issuing as U.S. Pat. No. 9,757,871 on Sep. 12, 2017, which is incorporated herein by reference.

The length of the rail portion of the table along the front of the saw determines how far the fence can be positioned from the blade, and therefore, the largest dimension that can be cut on the saw using the fence. This may be called the cutting capacity or rip capacity of the saw. Some table saws include rails sufficiently long to provide 36 inches of cutting capacity—in other words, the face of the fence nearest the blade is 36 inches away from the blade so a workpiece can be cut to 36 inches wide. Other table saws include rails with 52 inches of cutting capacity. Saws with these cutting capacities are typically stationary saws called cabinet saws or contractor saws. Smaller, portable saws, such as jobsite or benchtop saws, typically provide anywhere from 12 inches to about 30 inches of cutting capacity. These smaller, portable saws have shorter rails in order to minimize the size and weight of the saw. In an alternate exemplary embodiment, the rails may move or telescope out to provide increased cutting capacity.

Figure 12:
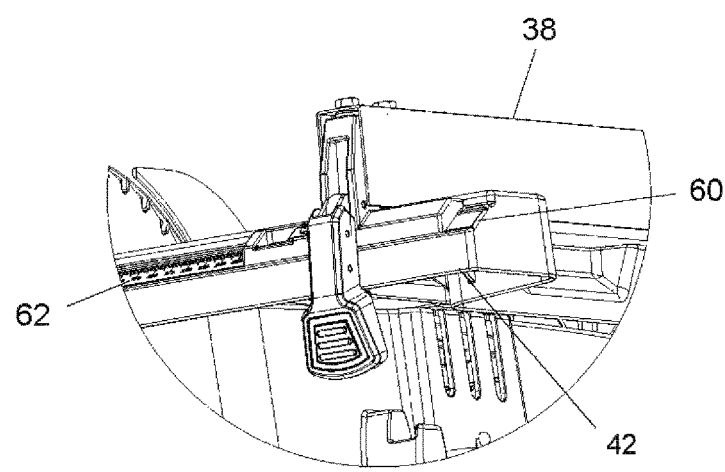
FIG. 12 shows a detail view of the portion of the table comprising a front rail.
Figure 13:
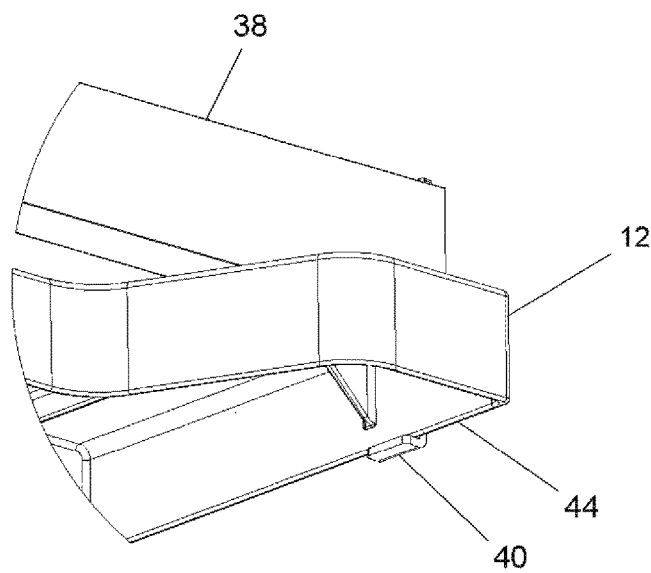
FIG. 13 shows a detail view of the portion of the table comprising a rear rail.

Examples of front and rear rail portions 42 and 44 are shown with fence 38 in FIGS. 12 and 13 respectively. The front rail portion is elongate with a channel 60 extending along the front face of the rail. The channel helps guide the fence when a user slides the fence along the rail. The channel also includes a ruler 62 that can be read by the user to facilitate positioning of the fence at a desired distance from the blade without having to use a separate tape measure. It can be seen in FIGS. 11 and 13 that fence 38 has an extension 40 which extends down from the back of the fence and then bends at a 90 degree angle towards the front of the saw to hook under the rear rail portion. When the handle portion of fence 38 is generally parallel with the main body of the fence, extension 40 is pushed away from the main body of the fence. In this configuration, the fence is free to slide to the left or right along rails 42 and 44. When the user has moved fence 38 to the desired position, the user would push the handle portion down to the position shown in FIGS. 11 and 12, which would clamp the fence to the front rail and position the angled portion of extension 40 underneath rear rail 44. The handle portion of fence 38 also has an extension that fits under rail 42 to further hold the fence in place during use.

Figure 14:
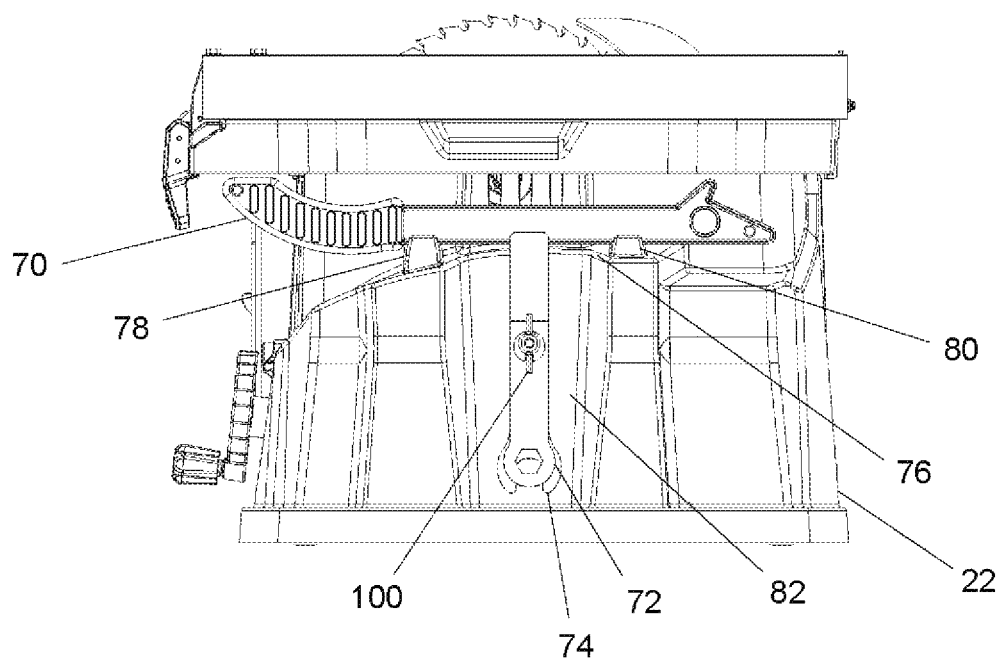
FIG. 14 shows a side view of the table saw of FIG. 1.
Figure 15:
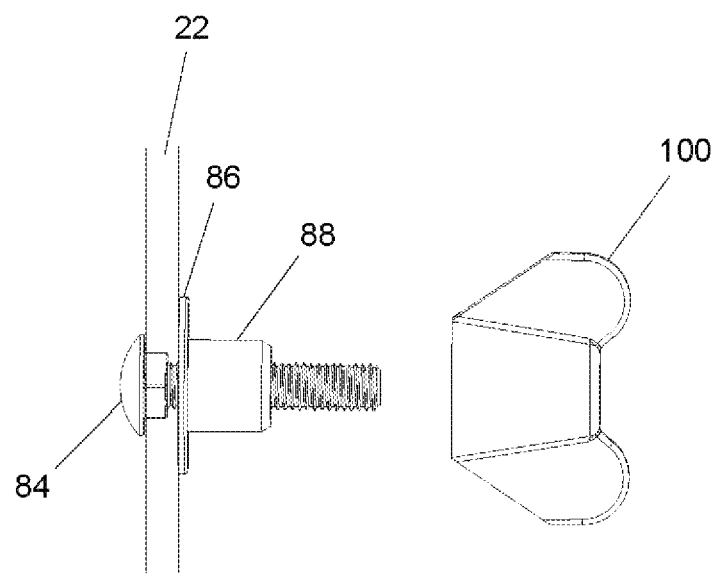
FIG. 15 shows the wrench mounting apparatus of FIG. 14 isolated.
Figure 16:
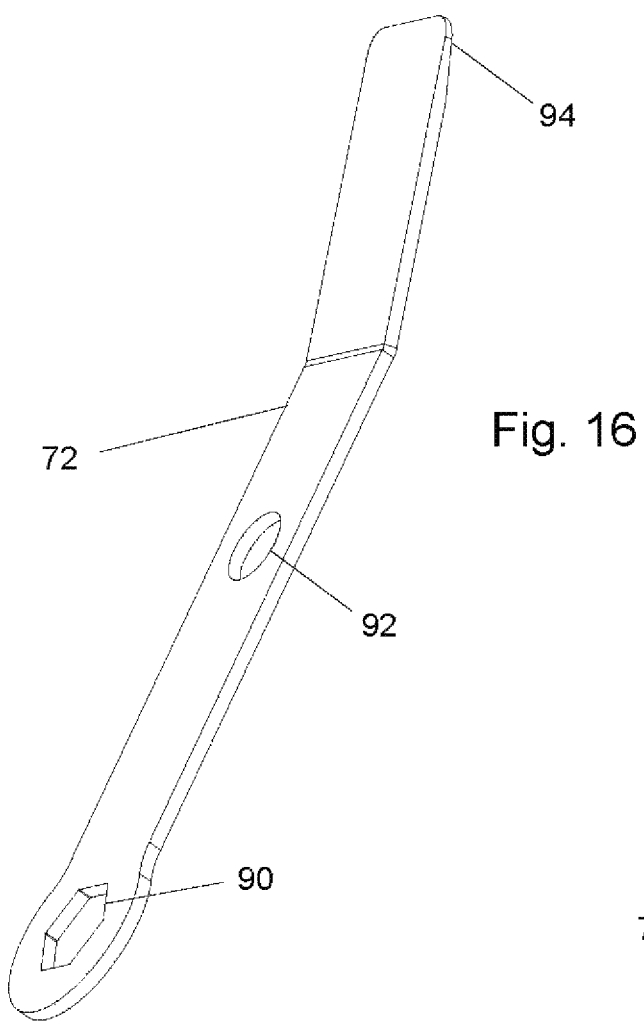
FIG. 16 shows the arbor nut wrench of FIG. 14 isolated.
Figure 17:
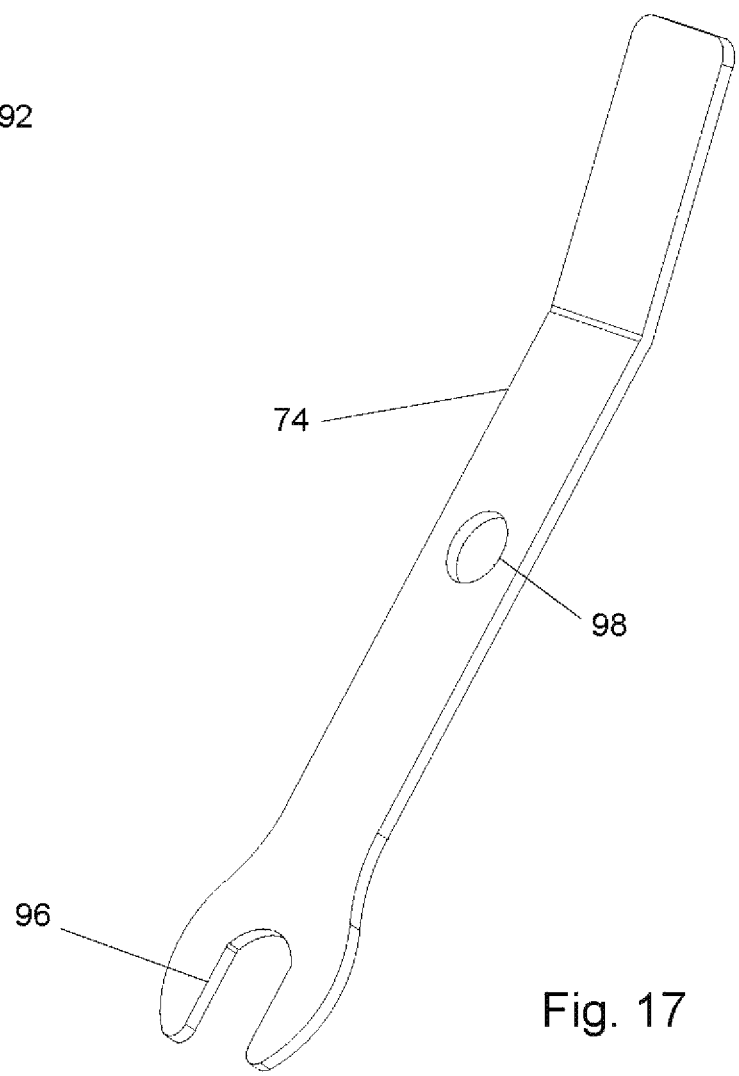
FIG. 17 shows the arbor flange wrench of FIG. 14 isolated.

Table saw 10 also includes on-board storage for a pushstick 70, an arbor nut wrench 72, and an arbor flange wrench 74, as shown in FIG. 14. The right side of housing 22 has a portion which extends out to form a ledge 76 with two sets of upwardly extending, U-shaped flanges, 78 and 80, which form a mounting system or structure to hold the pushstick 70. The inside edge of the outer portion of each flange has a tab that fits over a beveled portion of the pushstick to hold the pushstick in place. In an alternate exemplary embodiment, housing 22 could also be formed with two or more generally T-shaped extensions around which a power cord could be wound. Saw housing 22 has a generally vertical, slightly recessed area 82 under the ledge 76, configured to provide clearance for wrenches 72 and 74 within the footprint of housing 22. A carriage bolt 84 passes through the recessed area to form a projection extending in a direction normal to saw housing 22, as shown in FIG. 15. A washer 86 and extension component 88 are tightly threaded onto the screw such that washer 86 abuts housing 22 and firmly secures bolt 84, as is shown in FIG. 15. FIGS. 16 and 17 show arbor wrenches 72 and 74, respectively. Arbor nut wrench 72 includes a socket 90 at one end configured to fit around an arbor nut, and a hole 92 sized to fit over extension 88 and the shaft of bolt 84. Arbor nut wrench 72 also includes a tapered end 94 which can be used to help remove brake cartridges used in table saws with active injury mitigation systems. Said brake cartridges stop and/or retract the blade in the event of an accident and they must be removed after use. Occasionally, the act of stopping and/or retracting the blade causes the brake cartridge to press tightly against its mount, and in that situation, arbor nut wrench 72 can be used as a lever to pry the brake cartridge off its mount. Arbor flange wrench 74 includes a generally U shaped opening 96 configured to fit around an arbor shaft, and a hole 98 sized to fit over extension 88 and the shaft of bolt 84. To store the wrenches on the side of the saw, a user would place the blade wrenches onto the shaft of bolt 84 and slide them over extension 88. The user would then place wing-nut shaped locking knob 100 on the shaft of bolt 84 and turn said knob to secure the wrenches so they could not slide off the extension and bolt. To remove the arbor wrenches, a user would simply rotate the locking knob in the opposite direction until it could be removed from the shaft of bolt 84, and then the user could slide one or both wrenches off of extension 88 and bolt 84.

Figure 18:
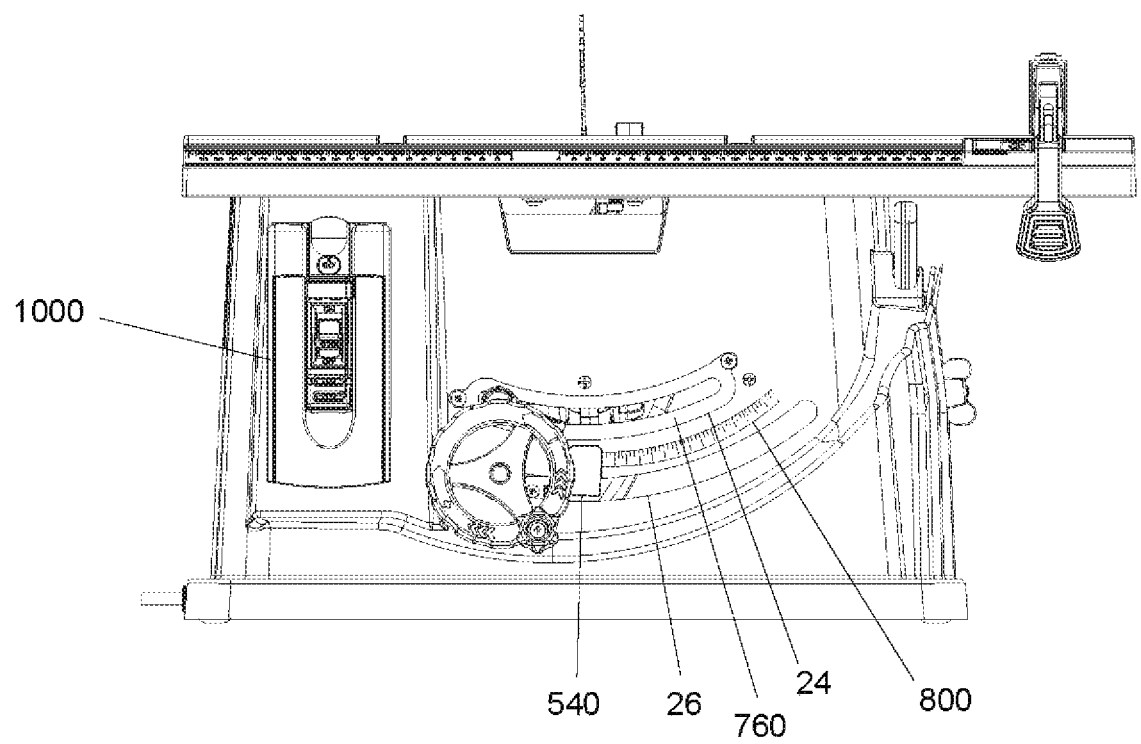
FIG. 18 shows a front view of the table saw of FIG. 1.

Table saws are typically started and stopped by a user flipping or triggering some type of switch on the saw. Such switches should be designed and positioned so they are easy and intuitive to use, but also so they are protected and so they can be repaired or replaced easily, if necessary. A switchbox having these characteristics is disclosed in US Patent Application Publication No. 2016-0243632, published Aug. 25, 2016, titled "Table Saws," which is herein incorporated by reference. FIG. 18 shows the position of switchbox 1000 in saw housing 22.

Figure 49:
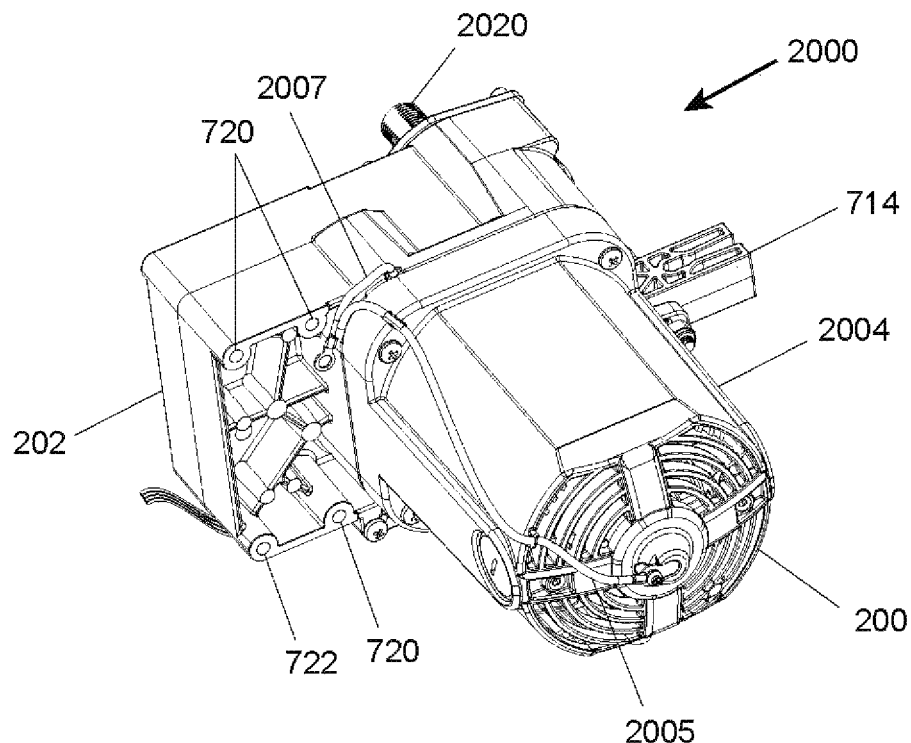
FIG. 49 shows a motor, gearbox, and alignment block isolated.
Figure 50:
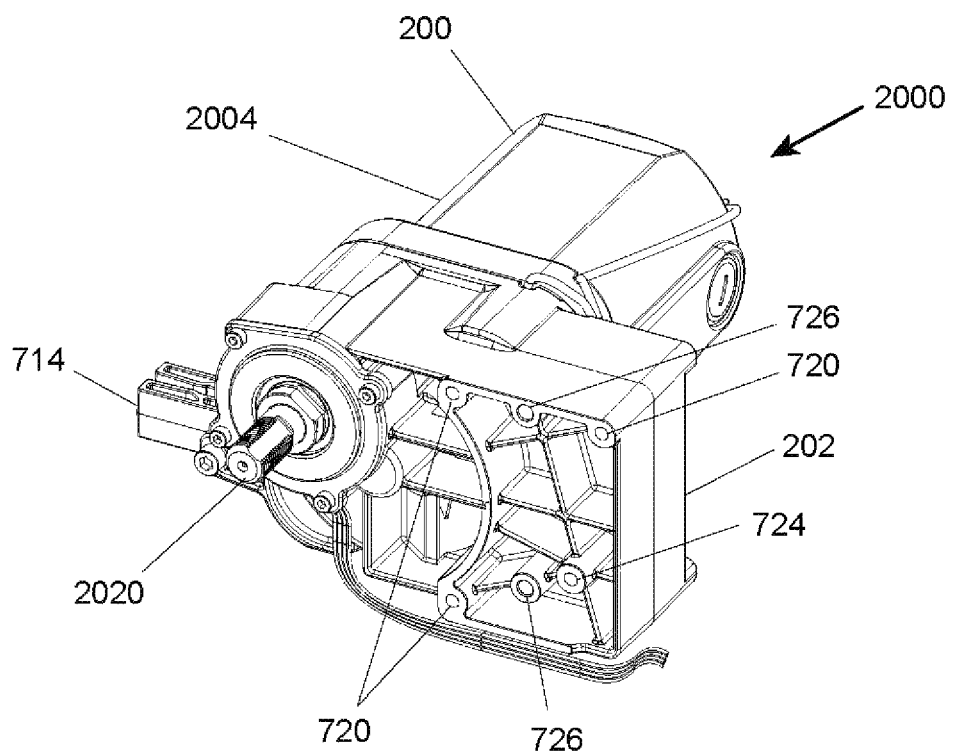
FIG. 50 shows another view of the motor, gearbox, and alignment block of FIG. 49 isolated.

Switchbox 1000 switches power to a motor 200 shown in FIGS. 2, 49, and 50. (FIG. 2 shows a left-side view of the internal mechanism of saw 10.) In the depicted embodiment, motor 200 is a direct drive universal motor. A gearbox 202 is attached to the motor and said gearbox is attached to elevation carriage 30. Elevation carriage 30 is a bent sheet metal part, shown isolated in FIGS. 38-39. In the depicted embodiment, an arbor block assembly is attached to elevation carriage 30 by bolts threading into sockets 720, 722 and 726 in the arbor block, as shown in FIGS. 49 and 50. The elevation carriage, in turn, is supported by a trunnion, such as trunnion 32 shown in FIG. 2, in such a way that the elevation carriage can raise and lower relative to the trunnion. The trunnion is supported by table 12 in such a manner that the trunnion can tilt relative to the table. In the depicted embodiment the trunnion tilts to the right when facing the front of the saw, but could be designed to tilt to the left.

Figure 19:
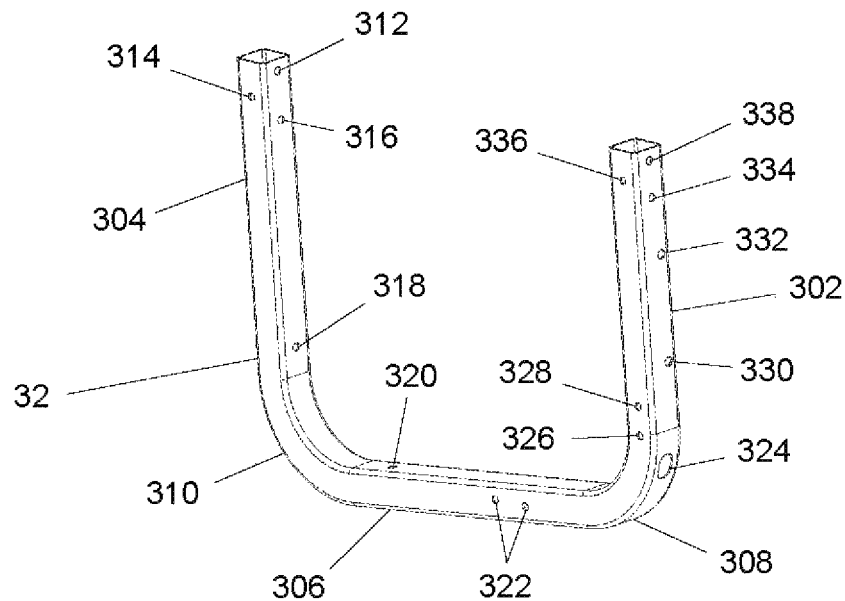
FIG. 19 shows the trunnion of FIG. 2 isolated.

In many saws, the trunnion is a die cast aluminum part, but in the depicted embodiment, trunnion 32, shown isolated in FIG. 19, is a torsion transfer member formed from a unitary piece of hollow steel tubing bent into a something similar to a U shape. This design is advantageous because it reduces the cost and complexity of manufacturing.

Trunnion 32 is comprised of two generally parallel, generally vertical sections 302 and 304, connected to a bottom section 306, by corners 308 and 310. Trunnion 32 has holes 312, 314, 316, 318, 320, 322, 324, 326, 328, 330, 332, 334, 336, and 338, the uses of which will be discussed later. While only one side of each hole is labeled in FIG. 19, each of the holes has an accompanying hole on the opposite side of the hollow trunnion tube. Rear section 304 extends slightly further down relative to front section 302, as seen in FIG. 2, so corner 310 has a slightly narrower angle than corner 308 since the bottom section 306 slopes or is angled such that the back end is lower than the front end, relative to table 12. The rear end of bottom section 306 is lower to provide clearance for bevel gears 350 and 352 as well as to allow elevation carriage 30 to be tall enough to provide stability in both the vertical and horizontal directions. This trunnion design has several advantages, including low cost, simplicity, and ease of manufacturing.

Figure 20:
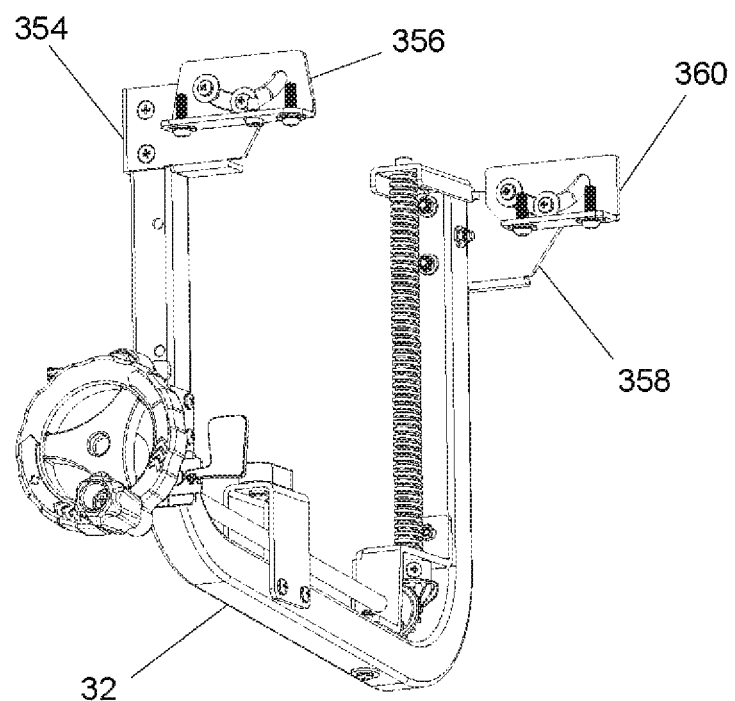
FIG. 20 shows the internal structure of FIG. 2 with some components removed.
Figure 21:
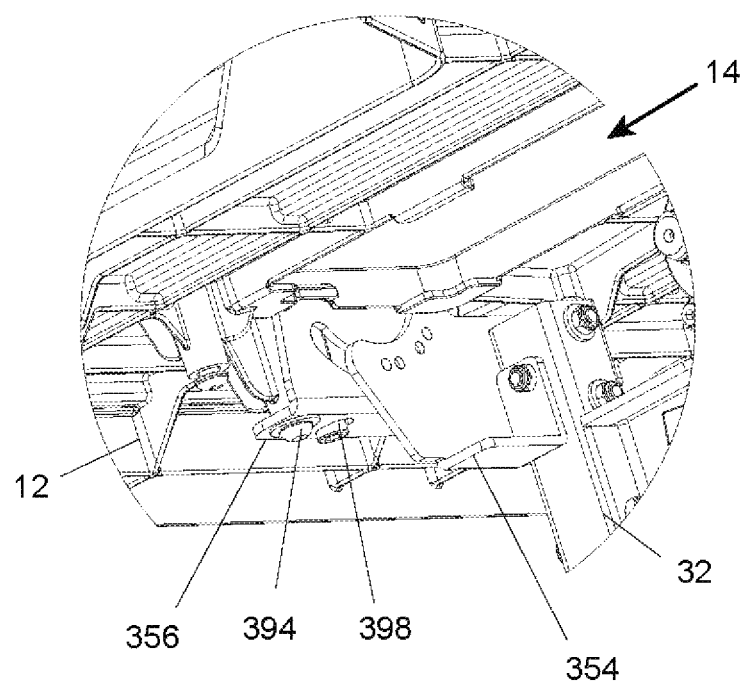
FIG. 21 shows a detail view of the front connection between the table and trunnion.
Figure 22:
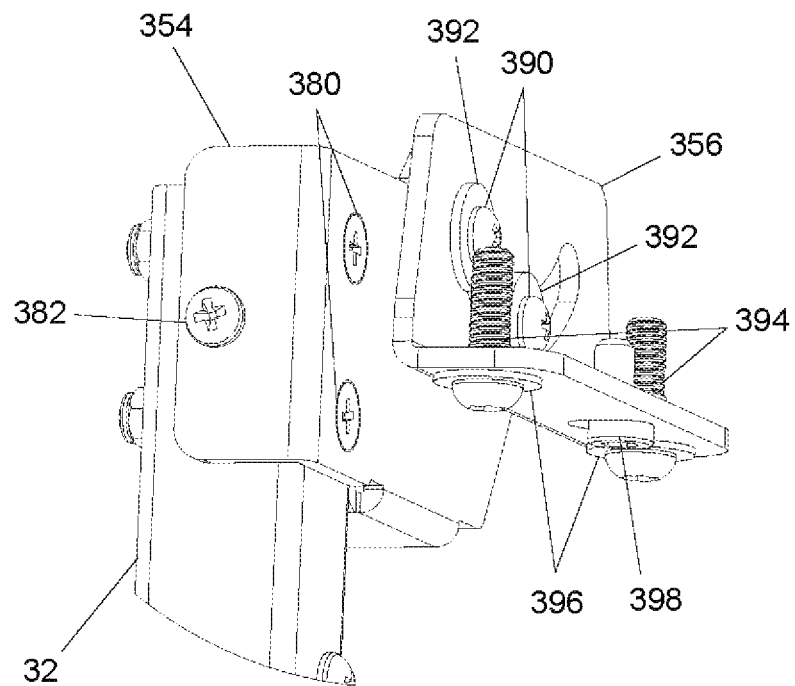
FIG. 22 shows another view of the front connection between the table and trunnion, with the table removed for clarity.
Figure 29:
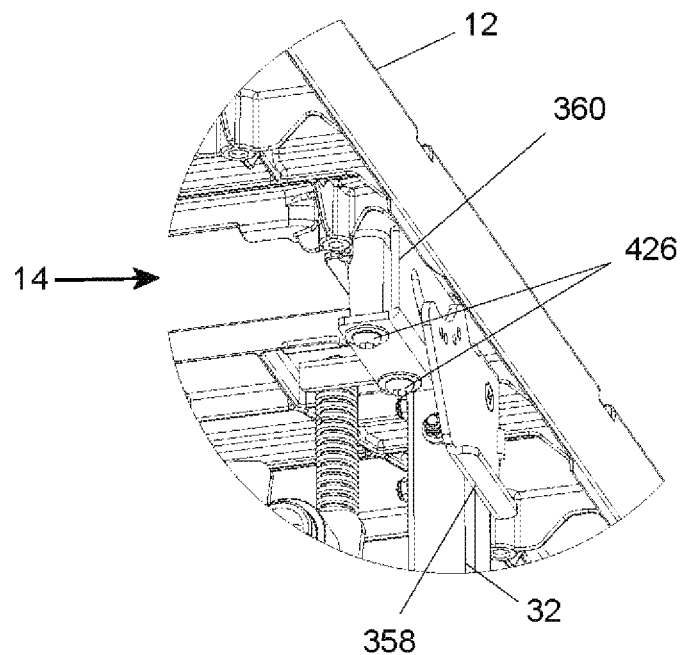
FIG. 29 shows a detail view of the rear trunnion connection to the table.
Figure 30:
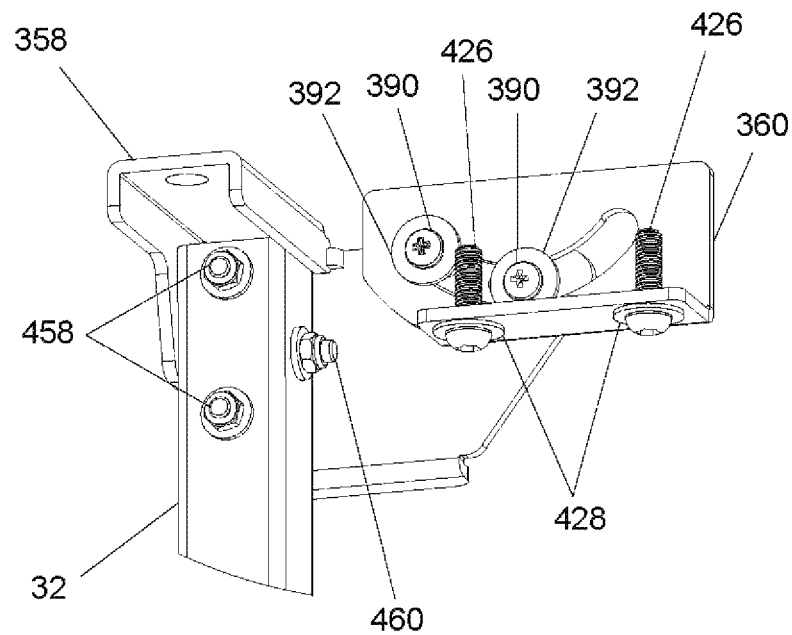
FIG. 30 shows another detail view of the rear trunnion connection to the table, with the table removed for clarity.

The trunnion 32 mounts to the table 12 via front and rear mounting plates 354 and 358, which are pivotally connected to respective front and rear trunnion brackets 356 and 360. The trunnion, mounting plates, and brackets are shown in FIG. 20, with some other structures of the saw removed for clarity. The front connection between the trunnion and table is shown in FIGS. 21 and 22, the front trunnion mounting plate is shown isolated in FIGS. 23 and 24, and the front trunnion bracket is shown isolated in FIGS. 25 and 26. The rear trunnion bracket is shown isolated in FIGS. 27 and 28, the rear connection between the trunnion and table is shown in FIGS. 29 and 30, and the rear trunnion mounting plate is shown isolated in FIGS. 31 and 32.

Figure 23:
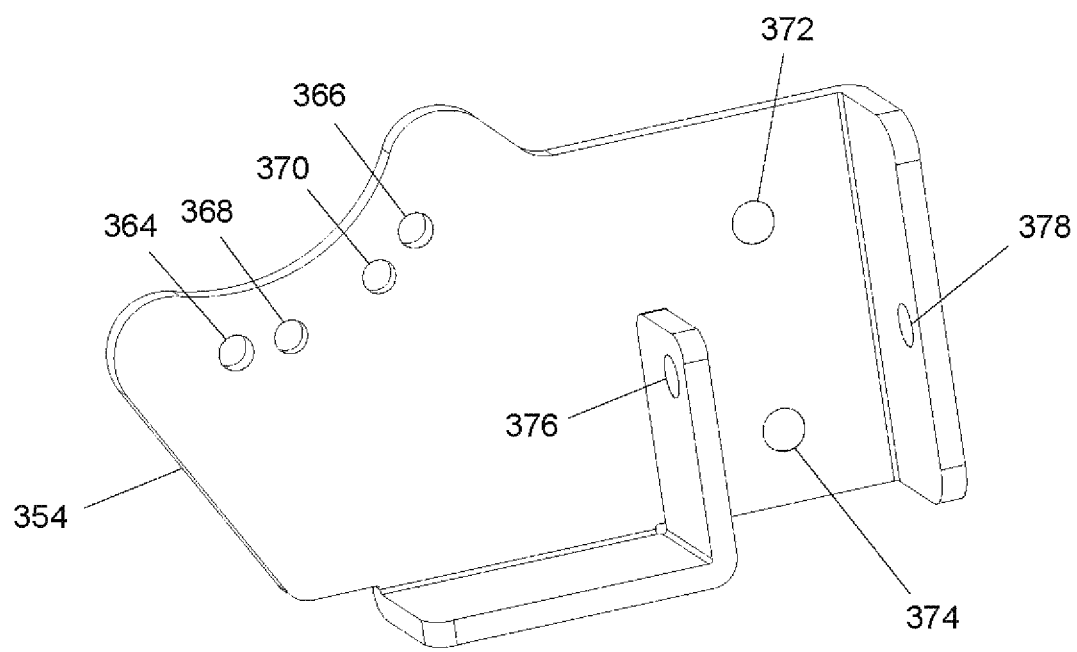
FIG. 23 shows a rear view of a front trunnion mounting plate isolated.
Figure 24:
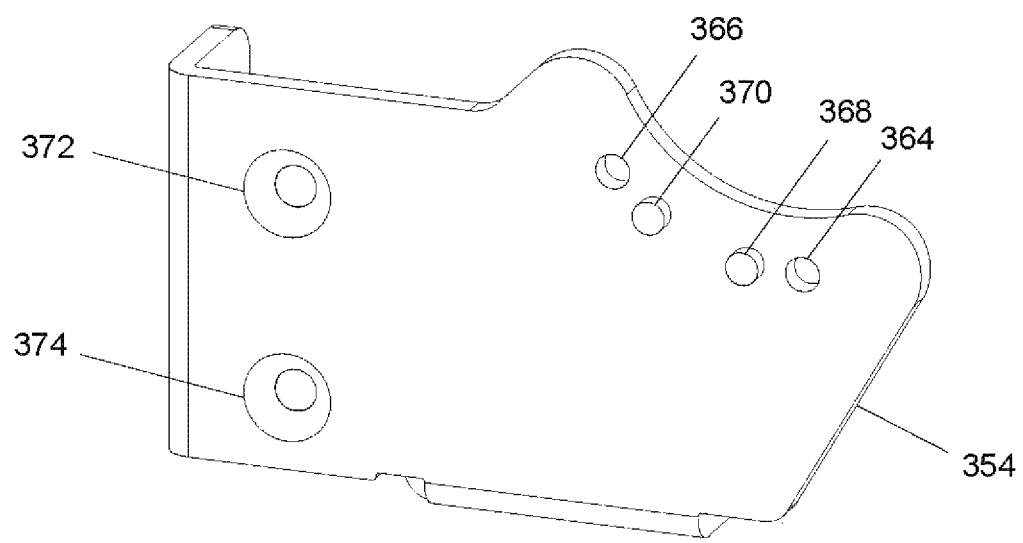
FIG. 24 shows a front view of the front trunnion mounting plate of FIG. 23 isolated.
Figure 25:
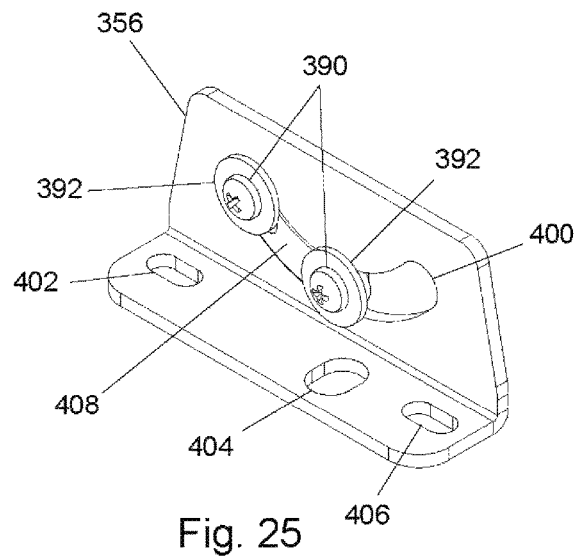
FIG. 25 shows a front view of a front trunnion bracket with some components installed thereon.
Figure 26:
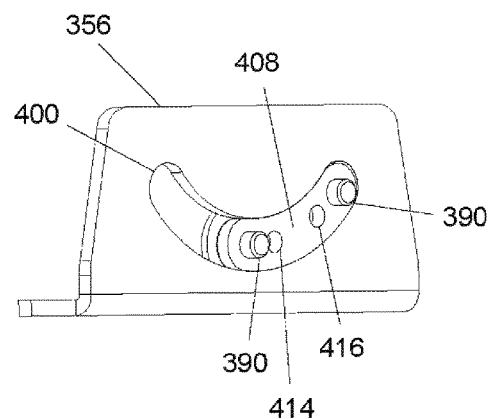
FIG. 26 shows a rear view of the front trunnion bracket of FIG. 25 with some components installed thereon.

Front trunnion mounting plate 354 is made from a unitary piece of bent sheet metal. FIG. 23 shows an isometric view of the back side of the mounting plate, relative to the front of the saw, and FIG. 24 shows the front side of the mounting plate. As shown in FIGS. 21 and 22, front trunnion mounting plate 354 mounts to trunnion 32 via three screws. Two parallel screws 380 pass through holes 372 and 374 in front trunnion mounting plate 354 and then through holes 338 and 334 respectively in trunnion 32. It can be seen in FIG. 22 that the parallel screws 380 are flush with the front edge of front trunnion mounting plate 354. This is because holes 372 and 374 are countersunk on the front side of the plate, as shown in FIG. 24, and the angled surfaces provide space for the heads of the screws. Each of the three screws used to attach front trunnion mounting plate 354 to trunnion 32 is held in place by a washer and hex nut, although it will be appreciated that other methods of attaching components to the trunnion could be used. The third screw, 382, passes through hole 378 in front trunnion mounting plate 354, through hole 336 in trunnion 32, and then through hole 376 in front trunnion mounting plate 354. Holes 376 and 378 are located on portions of front trunnion mounting plate 354 which are bent such that they are perpendicular to the main section. Front trunnion mounting plate 354 attaches to front trunnion bracket 356 via two screws 390, which pass through holes 364 and 366 in front trunnion mounting plate 354. Front trunnion bracket 356 has an elongate, generally horizontally oriented, arcuate opening 400, through which screws 390 pass, as shown in FIGS. 25 and 26. Between screws 390, there is an arcuate sliding piece 408, shaped to fit within, and slide along, arcuate opening 400, with holes for screws 390 and depressions 414 and 416, which are designed to receive cylindrical projections 368 and 370 on front trunnion mounting plate 354.

Front trunnion bracket 356 is shown with screws 390, washers 392, and sliding piece 408 in FIGS. 25 and 26. Sliding piece 408 can move within arcuate opening 400 in order to allow the trunnion 32 and accompanying blade, arbor, and motor, to tilt up to 45 degrees in order to allow a user to make angled cuts. Front trunnion bracket 356 is made from a unitary piece of sheet metal bent horizontally at an angle of about 90 degrees about a third of the way up the piece. The horizontal third of the bracket has three holes 402, 404, and 406. Two screws 394 pass through washers 396 and holes 402 and 406 in front trunnion bracket 356 and attach to table 12, as shown in FIGS. 21 and 22. Eccentric roller 398 passes through hole 404 in front trunnion bracket 356 and inserts into a projection in table 12. It can be seen in FIG. 25 that holes 402 and 406 are oblong, with the long sides parallel with the bend in the front trunnion bracket 356. Hole 404 is also oblong, but is wider than holes 402 and 406, and its long sides are perpendicular to the bend in the front trunnion bracket 356. A user could rotate the eccentric roller 398 in hole 404 in order to provide fine lateral adjustment for the trunnion and therefore the blade and motor assembly relative to the table. The front trunnion bracket is allowed to have slight lateral movement with the rotation of eccentric roller 398 because holes 402 and 406 can move relative to screws 394.

Figure 27:
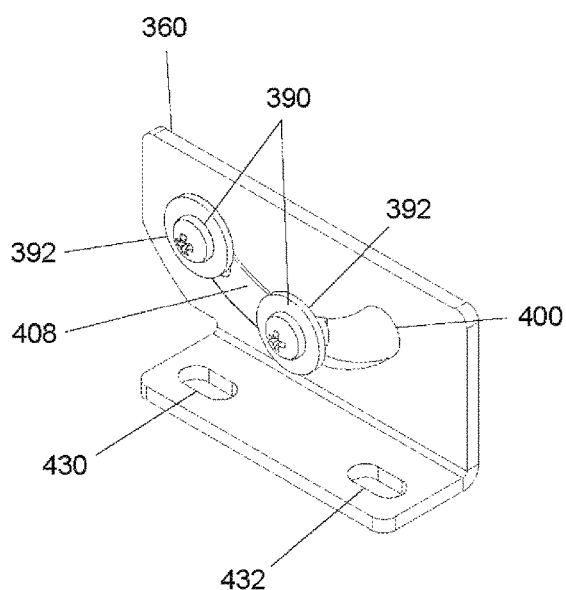
FIG. 27 shows a front view of a rear trunnion bracket with some components installed thereon.
Figure 28:
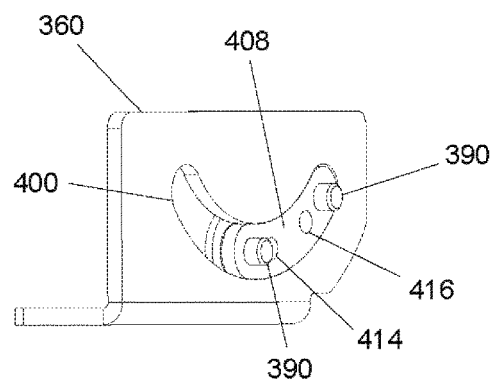
FIG. 28 shows a rear view of the rear trunnion bracket of FIG. 27 with some components installed thereon.

Rear trunnion bracket 360 is shown with screws 390, washers 392, and sliding piece 408 in FIGS. 27 and 28. Both front trunnion bracket 356 and rear trunnion bracket 360 have identical arcuate openings 400, screws 390, washers 392, and sliding pieces 408. Rear trunnion bracket 360 is made from a unitary piece of sheet metal bent horizontally at an angle of about 90 degrees about a third of the way up the piece. Two screws 426 pass through washers 428 and holes 430 and 432 in the horizontal part of rear trunnion bracket 360 and attach to table 12, as shown in FIGS. 29 and 30. Holes 430 and 432 in rear trunnion bracket 360 are, like holes 402 and 406 in front trunnion bracket 356, oblong to provide lateral clearance for movement relative to screws 426 to allow for lateral adjustment of the trunnion.

Rear trunnion bracket 360 attaches to rear trunnion mounting plate 358 in the same manner in which front trunnion bracket 356 attaches to front trunnion mounting plate 354. Screws 390 pass through sliding piece 408 and holes 446 and 452 in rear trunnion mounting plate 358 to secure rear trunnion mounting plate 358 to rear trunnion bracket 360. Cylindrical projections 448 and 450 on rear trunnion mounting plate 358 are shaped to fit into corresponding cylindrical depressions 414, 416 in sliding piece 408 to provide additional stabilization between the rear trunnion mounting plate 358 and rear trunnion bracket 360. This connection, as well as the connection between the rear bracket and the table is shown in FIGS. 29 and 30.

Both front and rear trunnion brackets are installed in table saw 10 such that the horizontal sections used to attach the trunnion brackets to the bottom of table 12 both extend towards the front of the saw.

Figure 31:
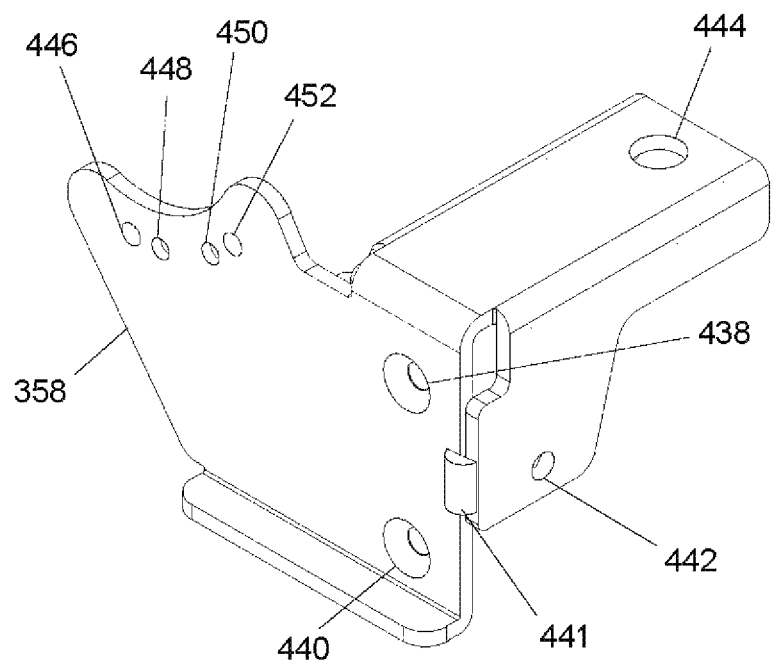
FIG. 31 shows a rear view of a rear trunnion mounting plate isolated.
Figure 32:
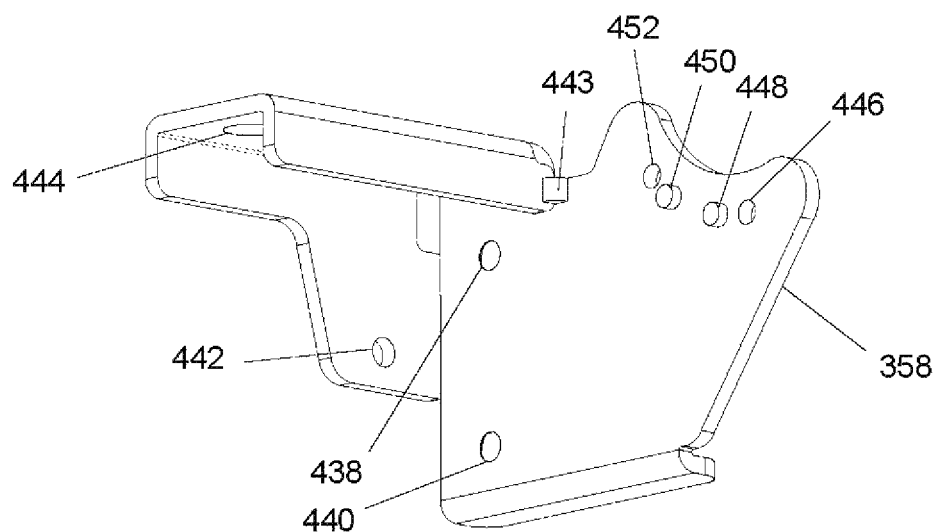
FIG. 32 shows a front view of the rear trunnion mounting plate of FIG. 31 isolated.

Rear trunnion mounting plate 358 is shown isolated in FIGS. 31 and 32. It is made from a unitary piece of sheet metal bent to fit around the back and over the top of the rear vertical component 304 of trunnion 32, as shown in FIGS. 29 and 30. Two parallel screws 458 pass through holes 438 and 440 in rear trunnion mounting plate 358 and then through holes 312 and 316 in trunnion 32. A third screw 460, which is perpendicular to the two screws 458, passes through hole 442 in rear trunnion mounting plate 358 and hole 314 in trunnion 32. As with the front trunnion mounting plate, the three screws 458 and 460 are secured by washers and hex nuts.

It will be appreciated by those of ordinary skill in the art that folded portions of sheet metal parts, such as the trunnion mounting plates, could be welded to another portion of the part in order to strengthen the overall part. Examples of such welds are shown in FIG. 31 at 441, and in FIG. 32 at 443.

Figure 33:
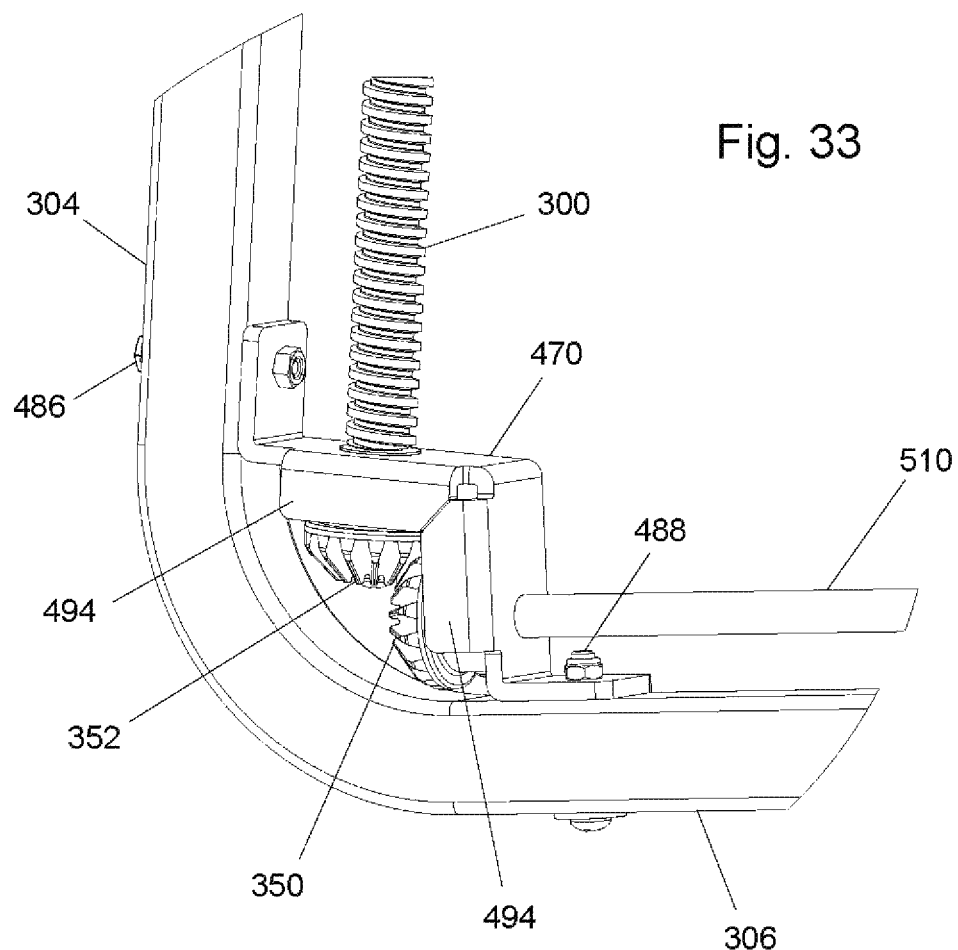
FIG. 33 shows a detail view of part of the elevation mechanism of the table saw of FIG. 1.
Figure 34:
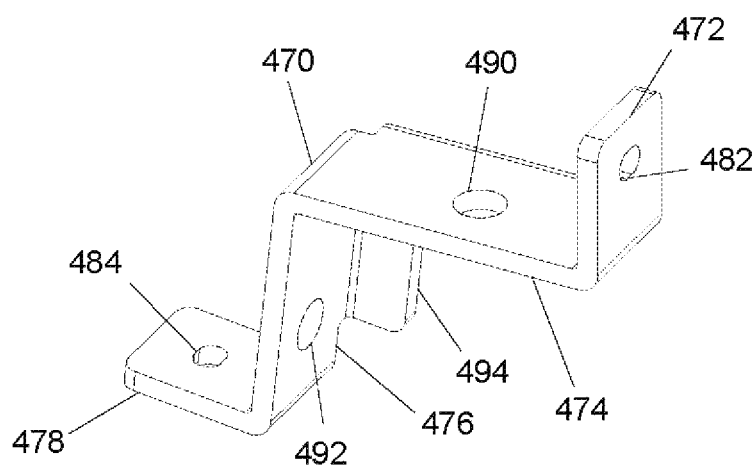
FIG. 34 shows the bevel gear bracket of FIG. 33 isolated.

FIG. 33 shows a bevel gear bracket 470 attached to sections 304 and 306 of trunnion 32 via two screws 486 and 488, which pass through holes 482 and 484 in sections 472 and 478 of the bracket respectively, and holes 318 and 320 in trunnion 32, respectively. Bevel gear bracket 470, shown isolated in FIG. 34, is generally shaped like a W with generally right angles and is made from a single piece of bent sheet metal with sections 472, 474, 476, 478, and 494. The two wing sections 494 extend towards each other from generally vertical section 476 and generally horizontal section 474 on one side of the bevel gear bracket. The wing sections provide stability and rigidity to the bracket. It is advantageous to only provide them on one side of the bevel gear bracket in order to allow for easy access to the bevel gears from the other side of the bracket.

Figure 35:
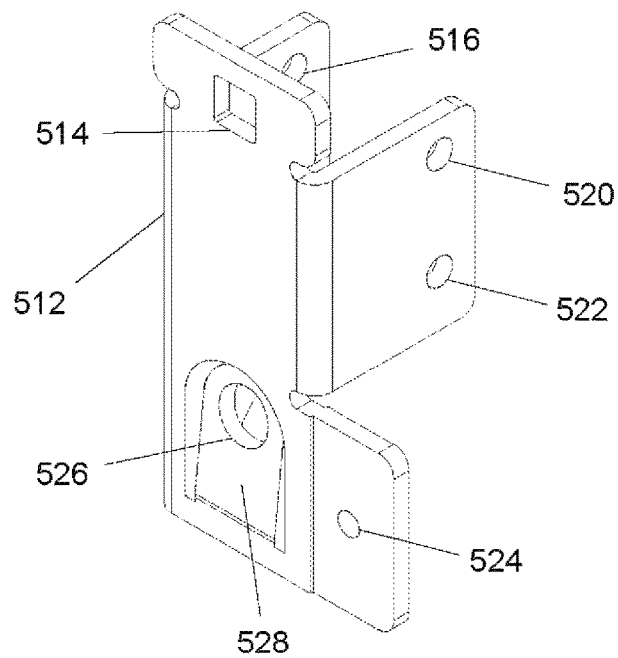
FIG. 35 shows the elevation shaft bracket of FIG. 2 isolated.
Figure 36:
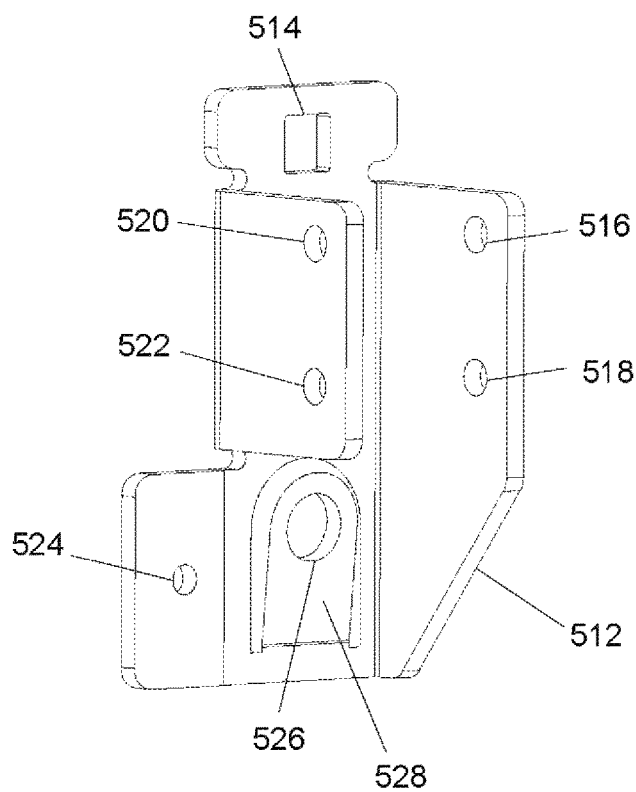
FIG. 36 shows another view of the elevation shaft bracket of FIG. 2 isolated.
Figure 37:
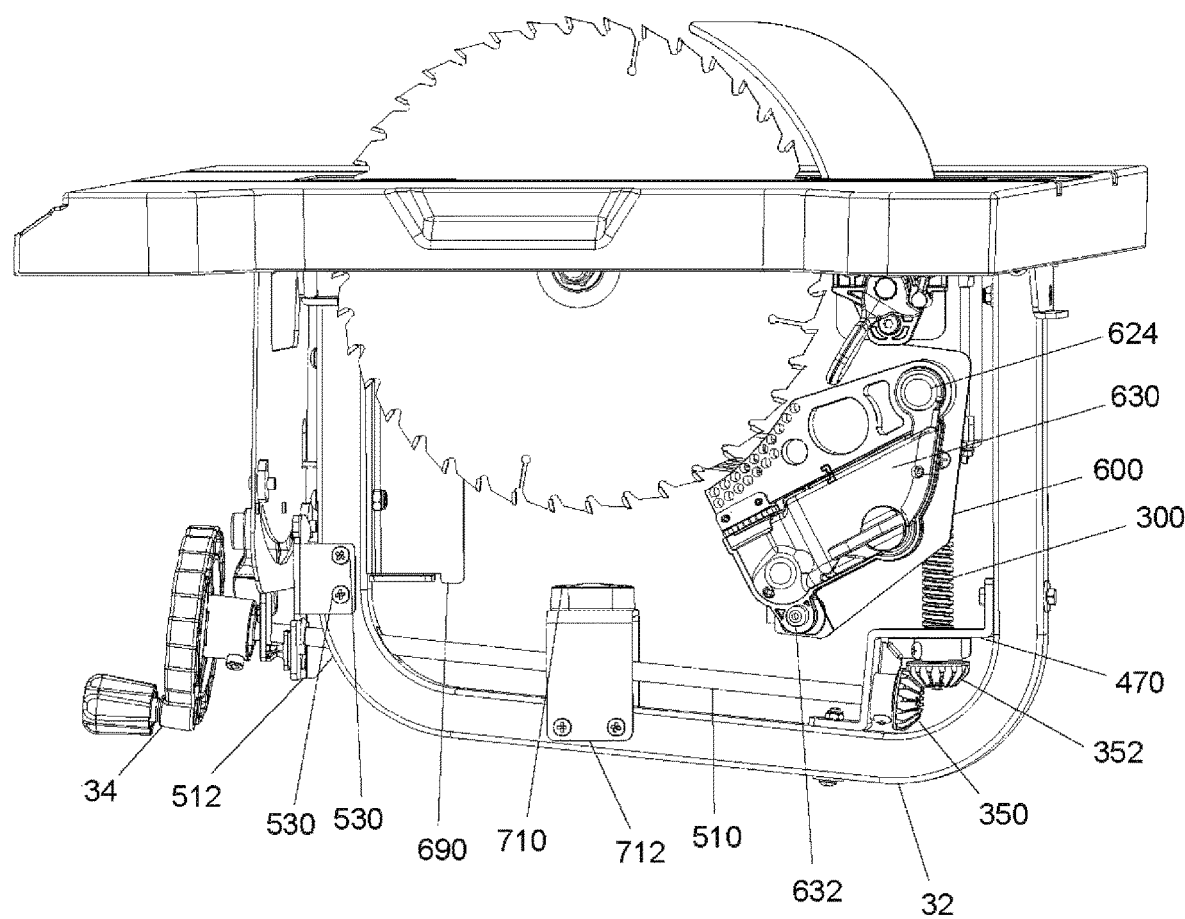
FIG. 37 shows a side view of the internal structure of the table saw of FIG. 1 with some components removed for clarity.

Hand wheel 34 connects to an elevation control shaft 510, which passes through an arcuate opening 26 in saw housing 22, an elevation shaft bracket 512, hole 324 in trunnion 32, through hole 492 in bevel gear bracket 470, and terminates in a bevel gear 350, as shown FIGS. 2, 33 and 37. FIGS. 35 and 36 show elevation shaft bracket 512 isolated from other structures. Elevation shaft bracket 512 is formed from a generally rectangular piece of sheet metal bent to fit around the front and sides of front vertical section 302 of trunnion 32. It is attached to trunnion 32 via two bolts 530, which pass through holes 516, 518, 520, and 522 in elevation shaft bracket 512 and holes 326 and 328 in trunnion 32, as shown in FIG. 37. When elevation shaft bracket 512 is viewed from the front of saw 10, the front third is generally rectangular, with an upside-down U shape 528 pressed into it at an angle, such that the curved part of the U is pressed further in to the metal. There is a hole 526 in the curved part of the U shape 528, through which elevation control shaft 510 passes, and the U shaped indentation 528 allows the hole 526 and elevation control shaft 510 to meet at a perpendicular angle. At the top of the front portion is an extension with a generally square hole 514 at the top through which a carriage bolt for a tilt lock lever passes, as will be discussed later in more detail. The left third of the bracket has two holes, 516 and 518, and the bottom corner is cut away at an angle of about 45 degrees, as shown in FIG. 36. The right third of the bracket has a horizontal cut approximately two thirds of the way down, with the top piece bent backwards parallel to the left third, and having two holes 520 and 522, which correspond with holes 516 and 518 in the left third. The bottom portion of the right third of the elevation shaft bracket is parallel with the front third, and it has a hole 524 through which a screw passes to mount a bevel gauge 540, as shown in FIG. 18. The front face of the bottom portion of the right third is recessed slightly, so that the left edge of the bevel gauge 540 meets the step between the face of the middle third and the bottom portion of the right third, which keeps the bevel gauge from rotating around the screw in hole 524.

The bevel gear 350 at the end of elevation control shaft 510 opposite hand wheel 34 is in operative contact with a bevel gear 352 at the base of a threaded elevation shaft 300. This is shown in FIGS. 2, 20, 33, and 37. Elevation shaft 300 is threaded at a shallow angle, and this design is advantageous because it forms a sort of anti-backdrive mechanism, since friction and the slope of the threads on shaft 300 keeps elevation carriage 30 and its accompanying components from slipping or drifting down unexpectedly. The bottom of the threaded elevation shaft passes through a hole 490 in the bevel gear bracket 470 and the top terminates in a hole 444 in rear trunnion mounting plate 358 (labeled in FIG. 31). The top and bottom ends of the elevation shaft are not threaded.

Figure 38:
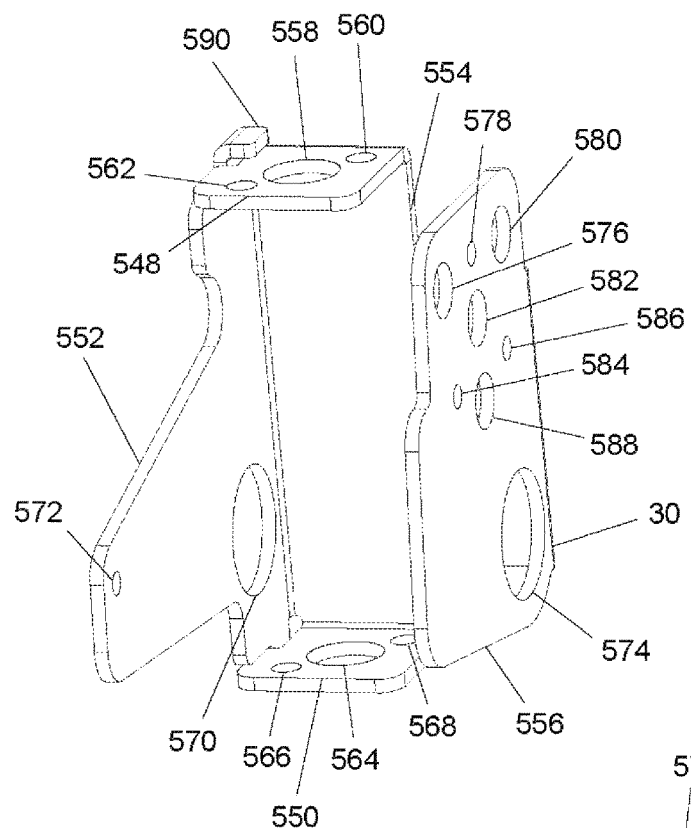
FIG. 38 shows an isometric front view of an elevation carriage isolated.
Figure 39:
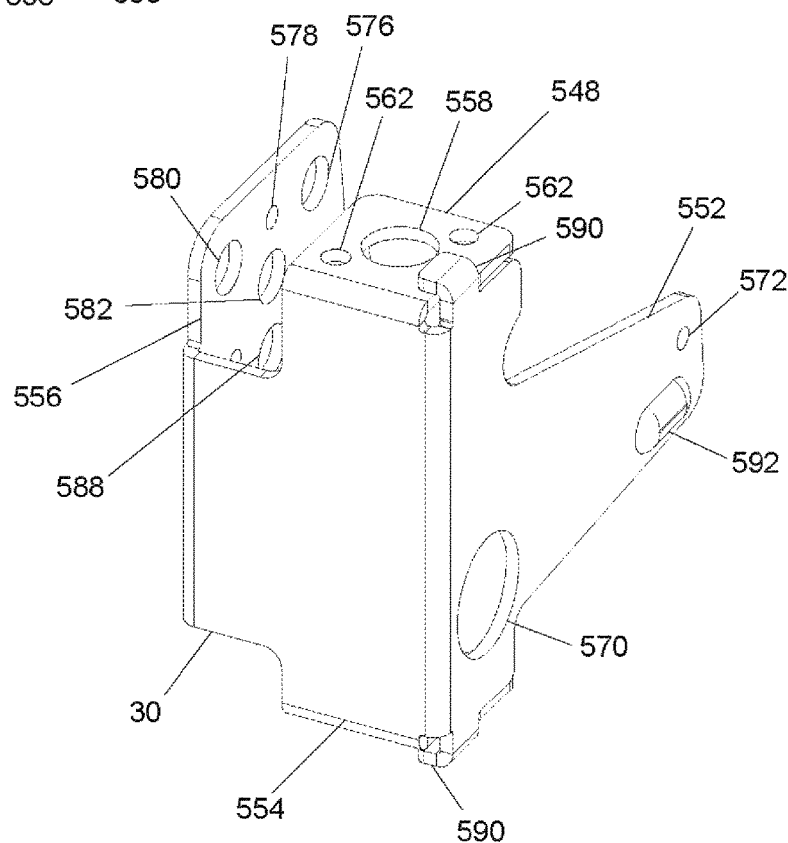
FIG. 39 shows an isometric rear view of the elevation carriage of FIG. 38 isolated.
Figure 48:
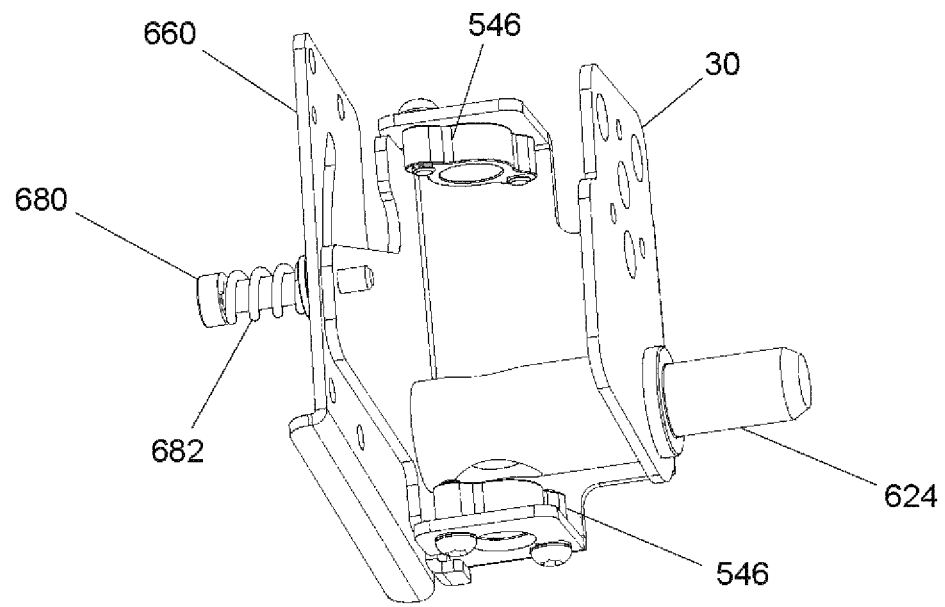
FIG. 48 shows a retraction bracket and elevation carriage with some additional components installed thereon.

Elevation carriage 30, shown isolated in FIGS. 38 and 39, is a piece of sheet metal bent to fit around threaded elevation shaft 300. Two threaded bushings 546 are non-rotatably mounted to the top and bottom of the elevation carriage 30, as shown in FIG. 48. As hand wheel 34 is rotated, it causes elevation control shaft 510 and bevel gear 350 to rotate, and bevel gear 350 meshes with bevel gear 352 on threaded elevation shaft 300 and causes the elevation shaft to rotate, thus causing the threaded bushings 546 and therefore elevation carriage 30 to move up or down along the shaft. It is advantageous that the threaded bushings be spaced as far apart as possible vertically in order to provide additional stability to prevent rotation of the motor and blade out of plane with the elevation carriage 30 and threaded elevation shaft 300.

Elevation carriage 30 is a single sheet metal piece, with a generally rectangular rear section 554, and four sections 548, 550, 552, and 556 extending in the same direction away from rear section 554 at an angle of about 90 degrees. Viewed from the front of the saw, rear section 554 has two corners cut into its right side, relative to the front of the saw. The part of rear section 554 left between the corners is bent at 90 degrees and becomes section 556, to which the riving knife mount is attached via holes 576, 578, 580, 582, 584, 586, and 588, and a cartridge bracket 600 is attached through hole 574, as will be discussed later. On the opposite side, rear section 554 is folded at about 90 degrees to become section 552, which is parallel to section 556. Hole 574 in section 556 lines up with hole 570 in the opposite section 552. A pivot shaft 624 passes through holes 570 and 574, as shown in FIG. 48, and its purpose will be discussed later. The top of section 552 extends away from rear section 554 about half the distance of opposite section 556, and then extends at a slight downward angle further away from rear section 554 until it is longer than opposite section 556, before terminating in a nearly vertical surface and angling back towards rear section 554. At the front end of section 552, relative to the front of the saw, is a metal detent projection or pin 592 and its role in the retraction of the motor and blade as part of the active injury mitigation system will be discussed later. A feature of the depicted embodiment is that metal detent pin 592 is formed by stamping elevation carriage 30. In other words, in the depicted embodiment metal detent pin 592 is a stamped projection. This decreases the manufacturing cost of the saw, since fewer parts are needed, and stamping sheet metal parts is a relatively simple process.

Above the metal detent pin 592 there is a threaded socket 572, the purpose of which will also be discussed later. At the top and bottom of section 554 are two small tabs, 590, which fold over matching sections 548 and 550. Tabs 590 serve to limit the vertical movement of elevation carriage 30 and, therefore, prevent blade 18 from moving too far up or down. The upper elevation limit is defined by rear trunnion mounting plate 358, and the lower elevation limit is defined by bevel gear bracket 470. In an alternate exemplary embodiment, tabs 590 could include screws or other adjustment mechanisms to allow fine adjustment of the vertical range of movement for elevation carriage 30. The matching sections 548 and 550 are folded away from rear section 554 at about 90 degrees, and are generally perpendicular to sections 552 and 556, as shown in FIGS. 38 and 39. They have matching holes 558 and 564, respectively, through which threaded elevation shaft 300 passes. Holes 560 and 562 in section 548 line up with holes 568 and 556, respectively, in section 550, and the threaded bushings 546 are attached to elevation carriage 30 via screws passing through said holes.

Figure 40:
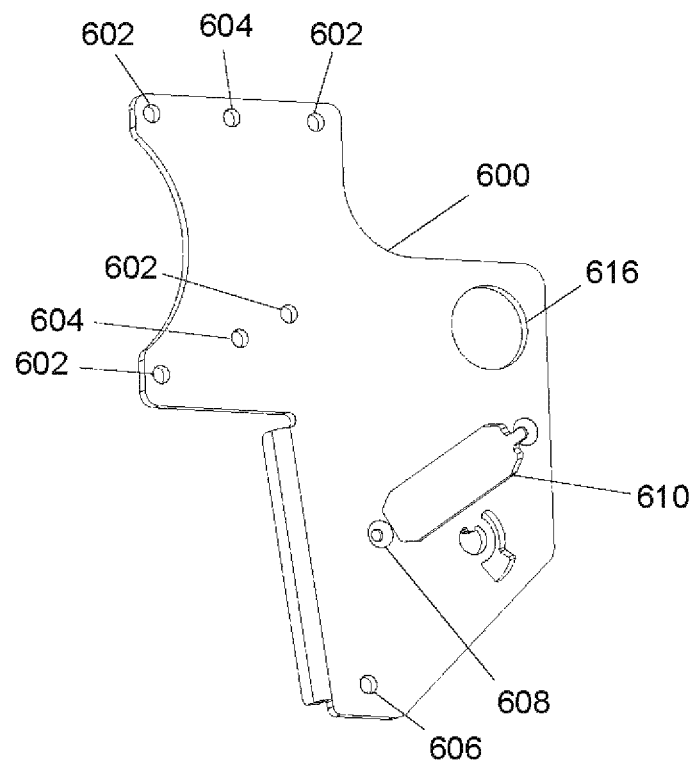
FIG. 40 shows a brake cartridge bracket isolated.
Figure 41:
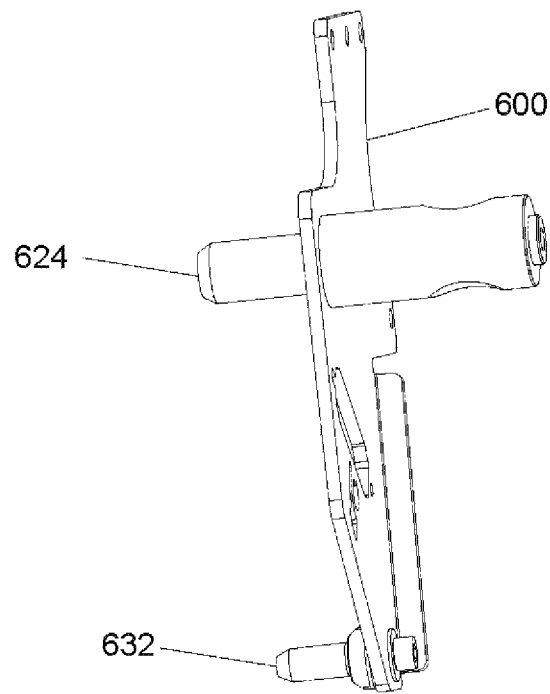
FIG. 41 shows the brake cartridge bracket of FIG. 40 with some components installed thereon.

Brake cartridge bracket 600, shown isolated in FIG. 40, is used to support a brake cartridge when table saw 10 includes an active injury mitigation system with a brake cartridge. It is pivotally attached to section 556 of elevation carriage 30 via pivot shaft 624, which passes through hole 616 in brake cartridge bracket 600 and holes 570 and 574 in elevation carriage 30, as shown in FIGS. 41, 44 and 48. Brake cartridge bracket 600 is formed from a single piece of sheet metal with holes 602, 604, 606, 608, 610, and 616. Hole 610 is shaped to allow a protrusion of a plug or socket, such as that on brake cable board housing 634, to pass through it, and it is shaped generally like a rectangle with the corners removed and it has a notch in the rear end (relative to the front of the saw), through which a screw passes in order support a plug or socket that connects to switchbox 1000. Additional support for brake cable board housing 634 is provided by a second screw which passes through hole 608 in brake cartridge bracket 600. A plastic positioning pin 632 is attached to the brake cartridge bracket through hole 606, as shown in FIG. 41. The brake cartridge bracket and plug are positioned so that brake cartridge 630 automatically engages the plug when the brake cartridge is seated on shaft 624 and plastic positioning pin 632. Hole 610 is slightly oversized to allow some play for brake cable board housing 634 to allow its D-Sub connector to contact the accompanying D-Sub connector in brake cartridge 630.

In the depicted embodiment, pivot shaft 624, positioning pin 632, and brake cartridge bracket 600 provide a single, fixed position for brake cartridge 630, as shown in at least FIG. 44. In some table saws, the system to mount a brake cartridge in the saw allows for the position of the brake to be adjusted so that the brake can be moved closer to or further from the edge of the blade. The depicted embodiment, in contrast, provides a stationary or fixed mount and the position of the brake cannot be adjusted. This simplifies the design and reduces the manufacturing cost of the saw. This also simplifies the operation of the saw because a user does not need to adjust the position of the brake cartridge relative to the blade. This also prevents a user from positioning the brake cartridge further from the blade than it should be, which might happen by mistake or inadvertence in a system where the position of the brake cartridge was adjustable. The design and function of brake cartridge 630 are described in detail in U.S. Pat. No. 8,459,157, issued Jun. 11, 2013, which is herein incorporated by reference.

FIG. 42 shows a brake cable board housing 634 attached to the side of brake cartridge bracket 600 on the side opposite where brake cartridge 630 attaches. Brake cable board housing 634 has a D-sub connector which connects with brake cartridge 630, and two cables 636 and 638. Cable 636 contains wires relating to a Hall Effect sensor to monitor blade rotation, detection signal monitoring, and grounding. Cable 636 may also connect to a conductive coupling used in some implementations of active injury mitigation technology. Conductive couplings for power tools with active injury mitigation technology are described in PCT Patent Application No. PCT/US17/34566, titled "Detection Systems for Power Tools with Active Injury Mitigation Technology," filed on May 25, 2017, and naming Stephen F.

Gass, John P. Nenadic and Louis R. Slamka as inventors, the disclosure of which is herein incorporated by reference. Cable 636 described above may correspond to cable or wire 274 in the PCT patent application, and the discussion concerning cable or wire 274 in the PCT application applies to cable 636 herein. Cable 638 connects to the switchbox. Internal circuitry and/or programming related to active injury mitigation technology may be housed in the brake cartridge, and/or in brake cable board housing 634. In the depicted embodiment, it can be advantageous to form the cable board housing from two parts that mate with something like a tongue and groove connection in order to minimize dust permeability.

Figure 45:
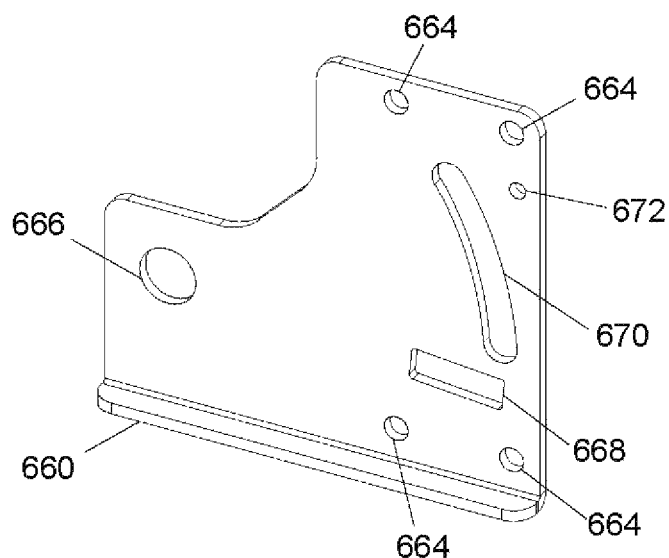
FIG. 45 shows a retraction bracket isolated.
Figure 47:
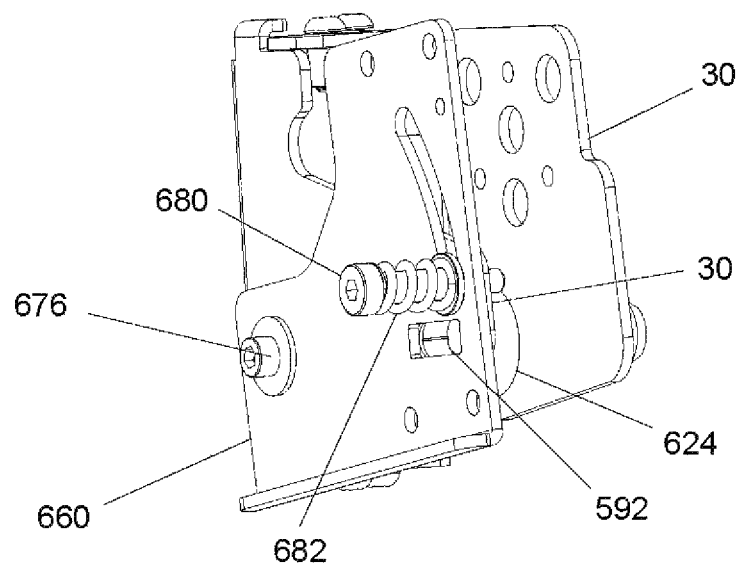
FIG. 47 shows a retraction bracket and elevation carriage with some additional components installed thereon.

Retraction bracket 660, shown isolated in FIG. 45, is pivotally attached to elevation carriage 30 via a bolt 676 which passes through pivot shaft 624 and hole 666 in the retraction bracket, as shown in FIG. 47. The retraction bracket can be thought of as shaped generally like a square, with a small ledge formed by bending the bottom edge out at an angle of about 90 degrees. The rear corner, relative to the front of the saw, is removed, leaving a horizontal edge and a vertical edge connected by a third edge, which is angled at about 45 degrees, as seen in FIGS. 45 and 47. The retraction bracket 660 also has a generally horizontally oriented rectangular slot 668 into which metal detent pin 592 on section 552 of elevation carriage 30 passes. It also has an elongate, arcuate opening 670, through which a bolt 680 passes. The bolt 680 is threaded into a socket 572 on the elevation carriage, and a spring 682 is interposed between the head of bolt 680 and retraction bracket 660, as shown in FIGS. 47 and 48. Spring 682 can be selected to provide any chosen amount of force, and tightening or loosening the bolt adjusts the amount of force the spring applies. Accordingly, the force between retraction bracket 660 and metal detent pin 592 can be adjusted by tightening or loosening bolt 680. In the depicted embodiment, spring 682 has a spring force on the order of 70 to 80 pounds, although other springs could be used. This serves to bias section 552 of elevation carriage 30 towards retraction bracket 660, which holds metal detent pin 592 in slot 668 until the active injury mitigation system is activated and the motor and blade are retracted under the table, as will be discussed later.

Figure 46:
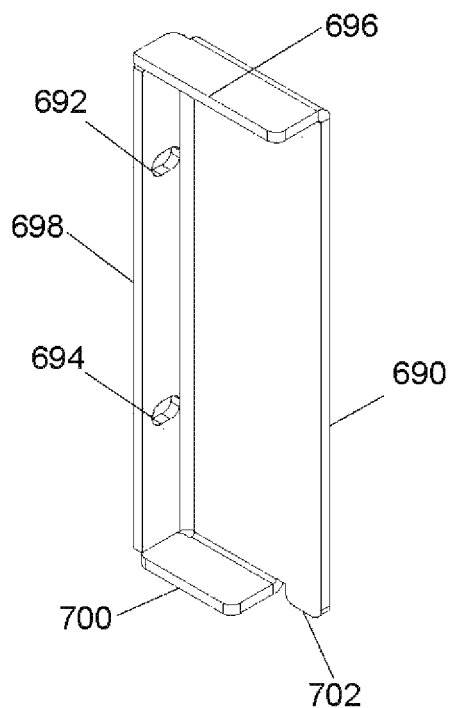
FIG. 46 shows an alignment bracket isolated.

Alignment bracket 690, shown in FIGS. 2 and 37 and shown isolated in FIG. 46, is attached to the back of vertical section 302 of trunnion 32 via two screws, which pass through holes 692 and 694 in alignment bracket 690 and holes 332 and 330, respectively, in trunnion 32. The alignment bracket provides stability and alignment. It helps to keep the motor, arbor, and blade from tilting out of alignment with the trunnion, especially when the blade is tilted for angled cuts and during retraction of the motor, arbor, and blade. Alignment bracket 690 is formed from a single piece of bent sheet metal, with the top edge 696 folded over 90 degrees to one side, and with side edge 698 folded over 90 degrees in the same direction to add rigidity. The bottom of alignment bracket 690 is divided in two unequal portions, and the portion 700, which is closer to the front of the saw, is bent at 90 degrees toward the side such that it is parallel with top edge 696 and perpendicular to the main section of the bracket and the side edge 698. The rear portion 702 of the bottom of alignment bracket 690 extends down until it is roughly parallel with the top of the hand wheel 34. Folded sections 696, 698, and 700 add stability to alignment bracket 690, and section 702 allows elevation carriage 30 to have an increased vertical range.

In many table saws, the elevation carriage and arbor block are both made from die cast aluminum. It can be advantageous to simplify the design and manufacture of a saw by using sheet metal components where possible, which add strength and decrease cost.

In the depicted embodiment, an arbor block assembly comprised of gearbox 202, brake cartridge bracket 600, and retraction bracket 660, is designed to pivot down to retract the blade and thereby help mitigate injury in the event a user accidentally contacts the spinning blade. It is a feature of the depicted embodiment that the arbor block assembly is composed of several components. Gearbox 202, which can also be referred to as an arbor block, is made from die cast aluminum, and the brake cartridge and retraction brackets are both made from sheet metal, such as 2-3 mm thick steel. This decreases the manufacturing cost of the saw, and it increases the strength of arbor block assembly in the areas where it might deform due to the forces involved in retraction. Motor 200 and gearbox 202 are shown in FIGS. 49 and 50.

A feature of the depicted embodiment is the method by which the motor and gearbox are formed, attached, and suspended in the saw so they tilt and retract with the blade. In the depicted embodiment, the motor and arbor comprise a direct drive system where the motor drives the arbor directly through gears rather than through a belt. In the depicted embodiment, the arbor and motor are designed to pivot down to retract the blade and thereby help mitigate injury in the event a user accidentally contacts the spinning blade. More specifically, table saw 10 includes an active injury mitigation system designed to stop and retract the blade in the event of an accident where a person contacts the spinning blade. The system includes a brake cartridge 630 positioned adjacent the blade, as shown in FIG. 37. Upon detection of contact, brake cartridge 630 will engage and stop the blade to minimize any injury, and in doing so, cause the blade to drop or retract until the gearbox contacts a rubber bumper or stop 710 mounted on the trunnion, shown in FIG. 37. The rubber bumper 710 is attached to a metal bumper mount 712, which is in turn attached to sloped bottom section 306 of trunnion 32 by screws passing through holes in metal bumper mount 712 and holes 322 in the trunnion.

In order to simplify the following discussion, arbor block/gearbox 202, with brake cartridge bracket 600 and retraction bracket 660, is referred to collectively as arbor block assembly 2000. In normal use, blade 18, motor 200, and arbor block assembly 2000 are prevented from pivoting down, or retracting, by the interaction between metal detent pin 592 on elevation carriage 30 and opening 668 in retraction bracket 660. Retraction bracket 660 is attached to elevation carriage 30, and retraction bracket 660 extends partway along the side of arbor block 202. Retraction bracket 660 is attached to the arbor block by four screws which pass through holes 664 in retraction bracket 660 to three holes 720 and one hole 722 in arbor block 202 (shown in FIG. 49). In the depicted embodiment, holes 720 pass all the way through the gearbox, while hole 722 only extends partway through. It will be appreciated by one of ordinary skill in the art that the location and number of screws could be varied, or other methods of attachment could be used to connect the retraction bracket to the arbor block.

Metal detent pin 592 on elevation carriage 30 fits into the rectangular slot 668 on the retraction bracket 660, which is in turn bolted to gearbox 202. The retraction bracket is a steel plate, approximately 2 to 3 mm thick, and is therefore relatively rigid. In normal use, the engagement between retraction bracket 660 and the metal detent pin 592 on elevation carriage 30 holds the arbor block assembly and motor in position and, therefore, holds the blade in position. However, when brake cartridge 630 engages and stops the blade, the angular momentum of the blade creates a downward force which typically is sufficient to push metal detent pin 592 out of rectangular slot 668 by flexing section 552 of elevation carriage 30. Arbor block assembly 2000 then pivots down around an axis defined by shaft 624, which causes the blade to retract below the table. In this system, the section 552 of elevation carriage 30 acts like a spring and flexes away from the retraction bracket when metal detent pin 592 is forced out of rectangular slot 668. The retraction bracket 660 presses against, and drags across, metal detent pin 592 as the motor, blade, and arbor block assembly pivot down, thereby absorbing some of the energy of the system. As discussed above, section 552 of elevation carriage 30 is additionally biased towards the retraction bracket by spring 682 on bolt 680. When the retraction bracket pivots with the motor assembly and blade, bolt 680 remains stationary since it is attached to elevation carriage 30, but the arcuate opening 670 on the retraction bracket moves relative to the spring and bolt. Bolt 680 can be adjusted to vary the amount of force required to push metal detent pin 592 out of rectangular slot 668, and to vary the amount of pressure the retraction bracket applies against metal detent pin 592 as the arbor block assembly, blade, and motor pivot down.

After retracting, arbor block assembly 2000 can be reset to its normal, operational position by simply moving the assembly up, either by hand or by the elevation control on the saw, until metal detent pin 592 snaps back into rectangular slot 668.

Brake cartridge bracket 600 is attached to the side of gearbox 202 opposite retraction bracket 660 via three screws which thread into the opposite sides of holes 720 and one screw which threads into hole 724. Two oversized pins are pressed into holes 604 in brake cartridge bracket 600 and into holes 726 in gearbox 202 to form an interference fit. Holes 602 in cartridge mounting bracket 600 require a small amount of clearance in order for the insertion of the screws into holes 720 and 722 in the gearbox 202, since the holes in the cartridge bracket are not threaded. This could allow cartridge bracket 600 and, therefore, cartridge 630 to move slightly, which is problematic because the spacing between the cartridge 630 and the blade 18 is important. The interference fit with the pins in holes 604 and 726 serves to minimize or eliminate motion of cartridge bracket 600 and cartridge 630 relative to blade 18.

Figure 51:
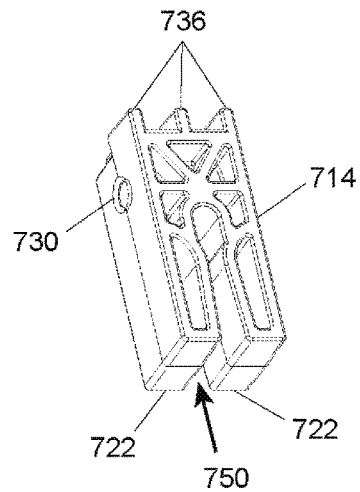
FIG. 51 shows an isometric top view of the alignment block in FIG. 49 isolated.
Figure 52:
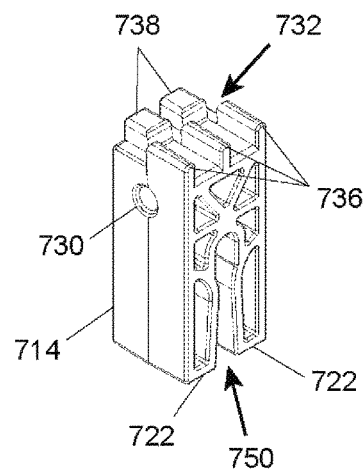
FIG. 52 shows a side isometric view of the alignment block in FIG. 49 isolated.
Figure 53:
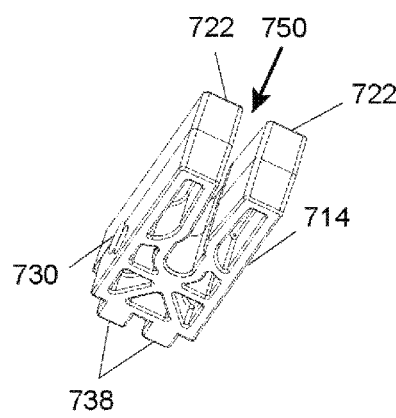
FIG. 53 shows a bottom isometric view of the alignment block in FIG. 49 isolated.
Figure 54:
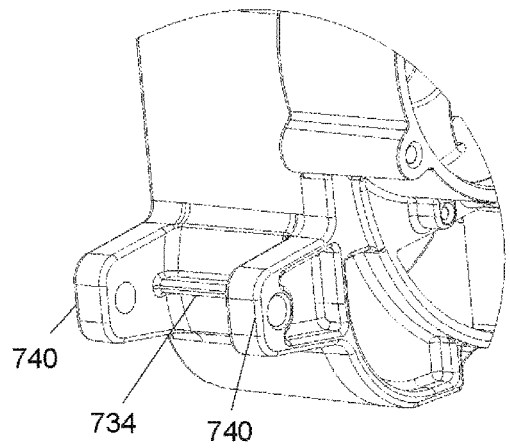
FIG. 54 shows a detail view of part of the gearbox of FIG. 49.
Figure 55:
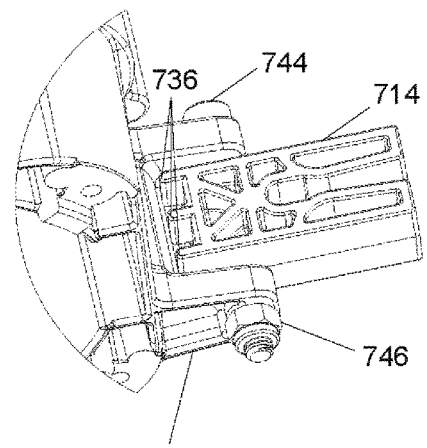
FIG. 55 shows a detail view of the alignment block of FIG. 49 attached to the gearbox of FIG. 49.

In the depicted embodiment, the end of gearbox 202 near alignment bracket 690 is supported by an alignment block 714, which is labeled in FIGS. 49, 50, and 55 and is shown isolated in FIGS. 51-53. A threaded hole 730 passes through the alignment block near its rear and is used to attach the alignment block to the gearbox. The rear of the block has a generally horizontal channel 732 defined by three top projections 736 and two bottom projections 738 on the rear of alignment block 714, configured to fit over a corresponding edge 734 on gearbox 202, as shown in FIGS. 54 and 55. The end of gearbox 202 adjacent alignment bracket 690 includes two mounting arms 740, each with a through hole, and the base of the alignment block fits on ledge 734 between mounting arms 740 so that the holes in the arms align with the hole 730 near the base of the alignment block. A bolt 744 passes through a hole in one of the two arms 740 on the gearbox, as shown in FIG. 55, and then goes through hole 730 in the alignment block and extends through the hole in the other arm on the gearbox. A self-locking nut 746, such as a nylon insert lock nut, is then threaded onto the bolt to hold the bolt still. With this configuration, turning bolt 744 causes alignment block 714 to move along the bolt, and thereby adjusts the lateral position of the arbor block and blade relative to the alignment block.

Alignment block 714 includes a vertical notch 750, which is perpendicular to horizontal channel 732 and is configured to fit over the rear edge of alignment bracket 690. Two arms or projections 722 form notch 750, and those projections extend over the rear edge of alignment bracket 690 to prevent the alignment block, arbor block assembly 2000, and motor from moving laterally, and to guide the alignment block as it moves up and down along the rear edge of alignment bracket 690 when elevation carriage 30 moves up and down and when the motor, arbor block assembly 2000, and blade retract.

The clearance between the two projections 722 and alignment bracket 690 is chosen to provide enough space so that the alignment block is held against most lateral movement, but not so much that it locks against the rear edge of alignment bracket 690 and prevents the motor, arbor block assembly, and blade from moving up and down. In the depicted embodiment, arbor block assembly 2000 retracts in an arc and, therefore, will move toward and away from the rear edge of alignment bracket 690 when it retracts and is reset. Retraction of the motor and arbor block assembly can involve significant forces, so alignment block 714 is made from 30 percent glass filled nylon in order to be strong enough to accommodate the forces involved in retraction.

Figure 56:
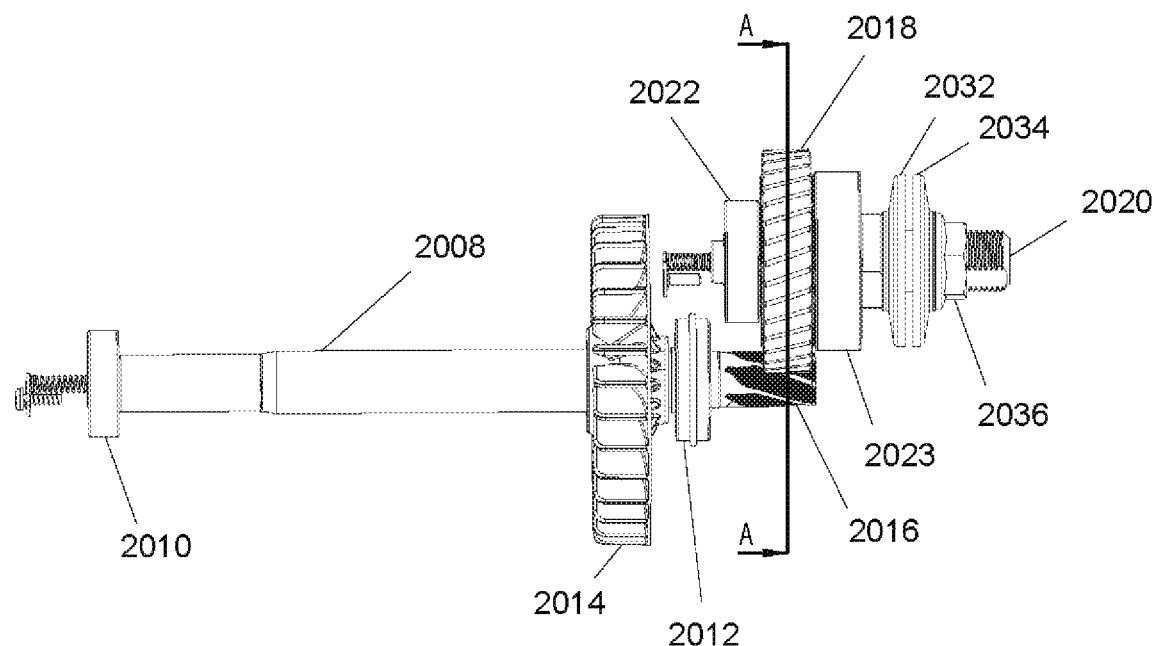
FIG. 56 shows some of the internal components of the motor and gearbox of FIG. 49 isolated.

Power saws such as the lightweight table saw shown at 10 in FIG. 1, hand-held circular saws, track saws, and miter saws typically include a motor that is directly coupled to the blade to drive the blade. Such a motor may be mounted on a moveable arm supported by a base as in the case of a miter saw, it may include a handle as in the case of a hand-held circular saw or a track saw, or it may be in a cabinet or housing as in the case of table saw 10 depicted in FIG. 1. FIGS. 49 and 50 show a motor 200 with a housing 2004, and FIG. 56 shows some of the components of motor 200. The motor includes a motor armature, as is known, and the motor armature includes a shaft, such as motor shaft or drive shaft 2008 shown in FIG. 56. The drive shaft is supported by bearings 2010 and 2012, which in turn are supported by motor housing 2004. A fan 2014 is mounted on shaft 2008 to cool the motor. The motor operates as is known in the art. FIG. 56 shows only selected portions of motor 200 for simplicity. For example, the windings that carry electric current to create the force to spin drive shaft 2008 are not shown, and the stator is not shown. The windings on the motor armature are insulated from drive shaft 2008, as is known in the art.

Figure 57:
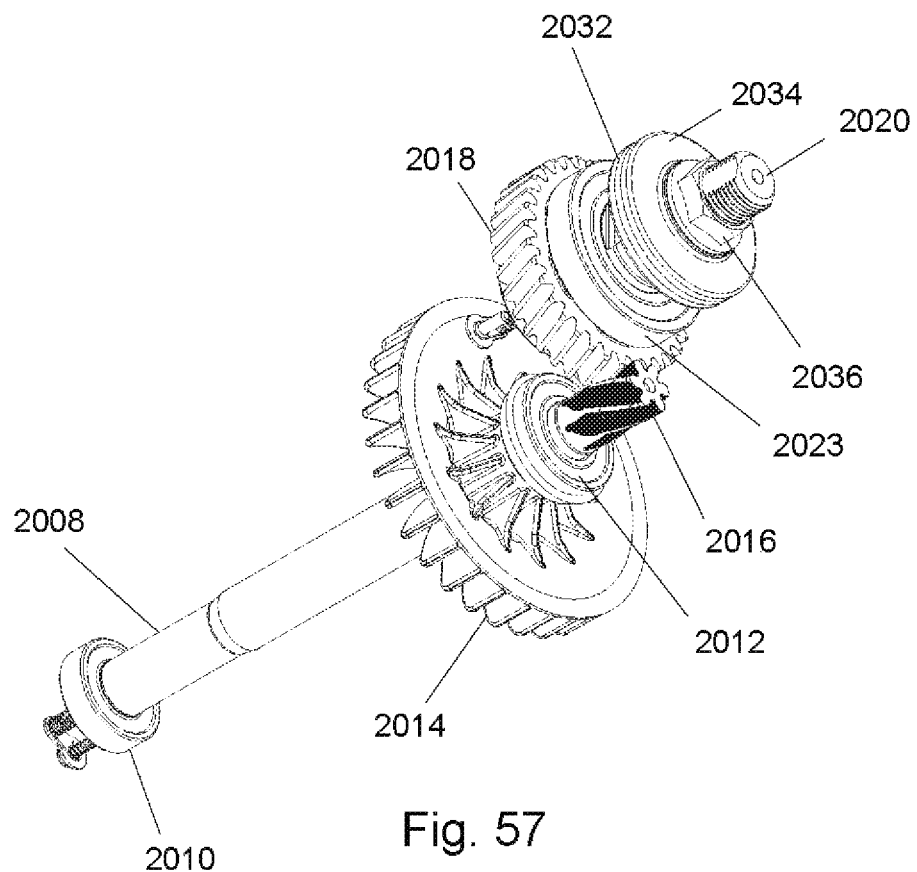
FIG. 57 shows a perspective view of FIG. 56.
Figure 61:
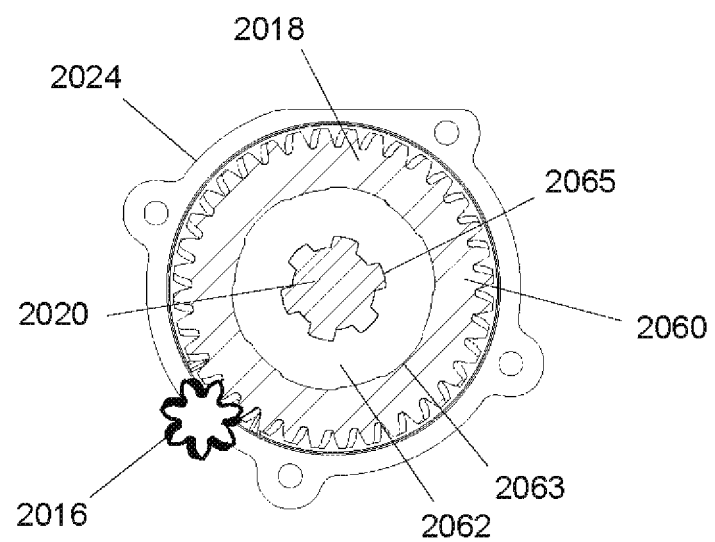
FIG. 61 shows another cross-sectional view of the gear of FIG. 58 in a housing.

Drive shaft 2008 includes a pinion gear 2016 at one end. Pinion gear 2016 meshes with a gear 2018, so that when drive shaft 2008 spins pinion gear 2016, pinion gear 2016, in turn, drives gear 2018. Gear 2018 is mounted on an arbor shaft 2020 which is supported by bearings 2022 and 2023, which, in turn, are supported in gearbox 202. Bearings 2022 and 2023 are labeled in FIG. 56, and bearing 2023 is labeled in FIG. 57. Bearing 2023 is supported in a carrier or case 2024, as shown in FIG. 61, and case 2024 is then attached to gearbox 202. Bearing 2022 is press fit into a bearing seat formed in gearbox 202. Blade 18 is held on arbor 2020 by collars 2032 and 2034, and by a nut 2036 which threads onto arbor 2020. Saw 10 is configured so that when drive shaft 2008 and pinion gear 2016 spin, gear 2018 also spins, causing arbor 2020 to spin and drive the blade. Gears 2016 and 2018 can be sized to cause the blade to spin at a desired speed. In a power saw as described herein, it would be common for an arbor and blade to spin at around 4,000 revolutions per minute. Saws with motors configured as shown in FIG. 56 are often referred to as direct drive saws.

In a direct drive saw equipped with an active injury mitigation system that imparts an electrical signal to the blade to detect accidental contact with a person, such as table saw 10, the blade must be isolated from electrical ground to maintain the signal on the blade. In the embodiment depicted in FIG. 56, electrical isolation of the blade is accomplished through gear 2018. In the depicted embodiment, gear 2018 is supported by arbor 2020 and is driven by pinion 2016. The reverse is also possible; gear 2018 could be on motor shaft 2008, and gear 2018 could drive another gear or pinion on arbor 2020.

Figure 58:
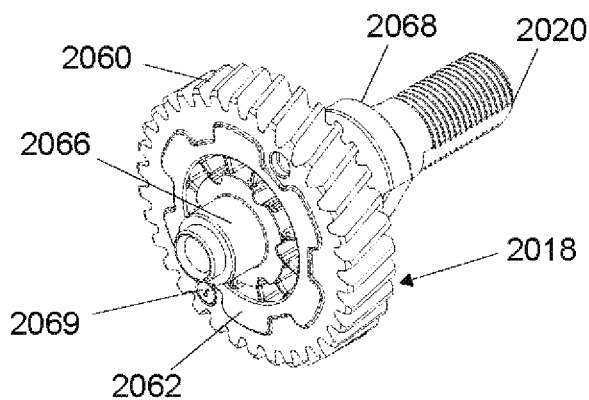
FIG. 58 shows a perspective view of an insulating gear.
Figure 59:
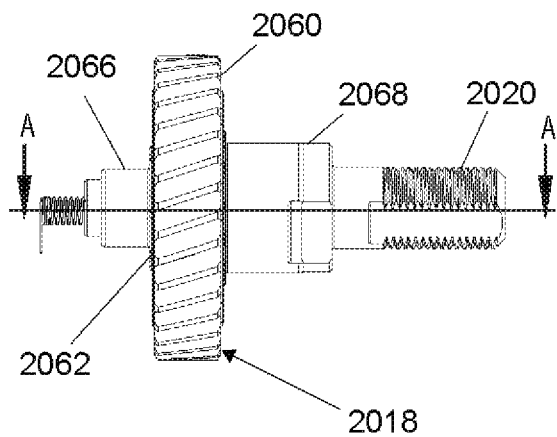
FIG. 59 shows a side view of the gear of FIG. 58.
Figure 60:
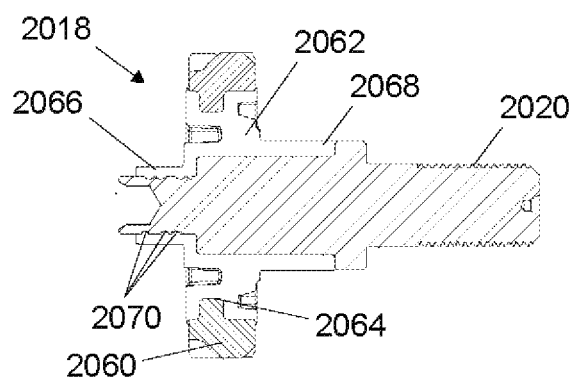
FIG. 60 shows a cross-sectional view of the gear of FIG. 58.

FIGS. 58, 59, 60 and 61 show arbor 2020 and gear 2018 in more detail, including cross-sectional views in FIGS. 60 and 61. FIG. 60 is taken along the line A-A in FIG. 59, and FIG. 61 is taken along the line A-A in FIG. 56. As can be seen, gear 2018 includes an outer ring 2060, which includes the teeth of the gear. Outer ring 2060 is made from metal, and specifically, can be made from powder metal or from a metal such as steel that is forged and cut. A non-conductive inner ring 2062, made from plastic, ceramic, or some other non-conductive material, is arranged concentrically along the interior of outer ring 2060. Splines or keys, such as spline 2063 in FIG. 61, prevent slipping or rotation between outer ring 2060 and inner ring 2062. Gear 2018 is formed or mounted on arbor shaft 2020, and arbor 2020 is made from metal. The end of arbor 2020 on which gear 2018 is mounted has keys or splines, such as spline 2065, which prevent slipping or rotation between inner ring 2062 and arbor 2020. Inner ring 2062, which is non-conductive, provides the necessary electrical isolation.

The depicted embodiment of gear 2018 has the advantage of maintaining the strength of a gear with metal teeth while giving the necessary electrical isolation. The non-conductive inner ring is positioned outward from the axis of rotation of the gear to maximize the surface area in contact with outer ring 2060 to minimize shear and to provide more torque. The gear and rings may take many different forms, and different numbers of rings may be used. The present embodiment is advantageous because the non-conductive inner ring 2062 can be made from a dielectric material such as injection molded plastic to reduce manufacturing costs.

One important consideration is the width of the gap between the conductive arbor shaft 2020 and the conductive exterior ring 2060. If the gap is narrow, capacitance between the metal arbor shaft 2020 and the motor shaft 2008 can increase, leading to coupling and noise, which can interfere with monitoring the signal on the blade and detecting accidental contact between a user and the blade. It is advantageous to maximize the amount of dielectric isolation material and minimize the quantity of conductive material without compromising the structural integrity of drive gear 2018. As an example, in a power tool with an active injury mitigation implementation where an electrical signal is imparted to the arbor and blade, noise may come through the gear driving the arbor, such as gear 2018 discussed herein. The teeth on the gear are in conductive contact with the motor shaft, and as the teeth mesh, any signal on the arbor can be perturbed by the movement of the gear teeth moving closer to and then further away from the motor shaft due to capacitance between the gear teeth and the arbor. Such perturbations can be called noise, and that noise can be sufficiently big and variable to affect the ability to detect reliably changes in the signal on the blade that indicate contact between a person and the blade. Providing a sufficient gap of non-conductive material between the arbor and the gear teeth minimizes such noise.

In the depicted embodiment, and at the position of the cross-section shown in FIG. 61, the diameter of inner ring 2062 measured from the outside of one spline 2063 to the outside of the opposite spline is 36.5 mm, and the diameter of the inner ring between the splines is 36 mm, making each spline 0.25 mm tall. However, the heights of the splines change depending on position, as seen in FIG. 58, where the visible, outside surfaces of the splines are higher than in FIG. 61. Outer ring 2060 has an internal, annular ridge 2064, shown in FIG. 60, and the height of the splines under that ridge is less, as shown in FIG. 61. Referring back to FIG. 61, the diameter of arbor 2020 measured from the outside of one spline 2065 to the outside of the opposite spline is 19 mm, while the diameter of the shaft between the splines is 15 mm, making each spline 2065 2 mm tall. Of course, splines of different dimensions can be used, and, as stated, gear 2018 can be sized to achieve the desired rotational speed of the blade. A common speed of rotation of the blade and arbor in a power saw as described herein is 4,000 revolutions per minute.

It has been found experimentally that a conductive shaft diameter of 15-19 mm, a non-conductive inner ring diameter of 38-46 mm, and an outer ring diameter of 52-59 mm provides an optimum balance of strength and electrical isolation.

The material forming inner ring 2062 can be selected to have a coefficient of thermal expansion similar to the material forming exterior ring 2060 and arbor 2020 to minimize any change of dimension that might result in slippage between the shaft, inner ring and exterior ring.

In the depicted embodiment, gear 2018 and arbor 2020 are manufactured as one piece. Arbor 2020 and outer ring 2060 are first formed, such as by machining or by forming from powder metal, or both. The arbor and outer ring are then positioned in a mold, and a non-conductive material is then injected into the mold between the arbor and the outer ring. The non-conductive material molds over the surface of the arbor and fills the space between the arbor and the outer ring to form non-conductive inner ring 2062. At the same time, the non-conductive material forms bearing seats 2066 and 2068 to support bearings 2022 and 2023, respectively. Grooves 2070 can be cut into the end of arbor 2020, as shown in FIG. 60, to increase the contact area between the arbor and bearing seat 2066, thereby minimizing the chance of gear 2018 moving relative to the arbor.

Motor housing 2004, as shown in FIGS. 49 and 50, can be coated with an electrically conductive material, such as conductive paint, either on the inside or outside of the motor housing, or both, to provide a shield to tend to block electrical noise such as radio frequency interference or electromagnetic interference. Due to its size and composition, blade 18 can function as an antenna and interfere with the intended function of the active injury mitigation system. In order to minimize this problem, the motor is electrically isolated, or "put in a tin can." The stator core of the motor can be grounded to further address this issue. Interference from electrical noise is further minimized through the use of shielded cables. The motor shaft can also be grounded to reduce noise. Grounding a motor shaft and/or an arbor is disclosed in U.S. Provisional Patent Application 62/343,451, filed May 31, 2016, and in PCT Application No. PCT/US17/34566, titled "Detection Systems for Power Tools with Active Injury Mitigation Technology," filed on May 25, 2017, both of which are incorporated herein by reference. It can be seen in FIG. 49 that two wires 2005 and 2007 extend from the interior of the motor housing. Wire 2005 is used to ground the motor shaft, preferably through a conductive coupling as disclosed in the above-identified PCT application. Wire 2007 grounds the stator through a simple static or non-moving connection. Both wires 2005 and 2007 are attached to retraction bracket 660 via a screw passing through hole 672 in retraction bracket 660 (labeled in FIG. 45). These alternatives can be used together to shield or block electrical noise.

Figure 62:
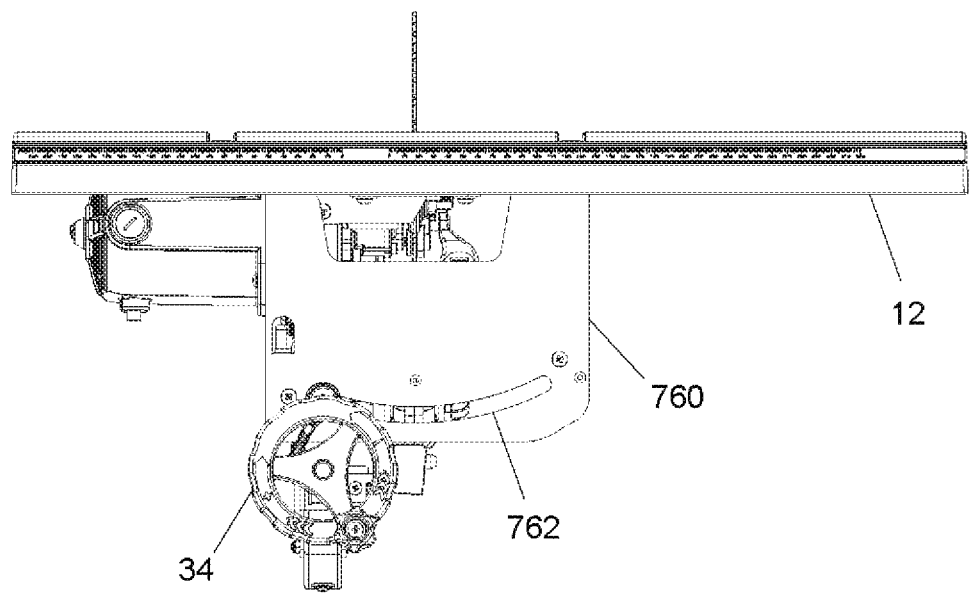
FIG. 62 shows part of the tilt mechanism of the table saw of FIG. 1 with some components removed for clarity.
Figure 63:
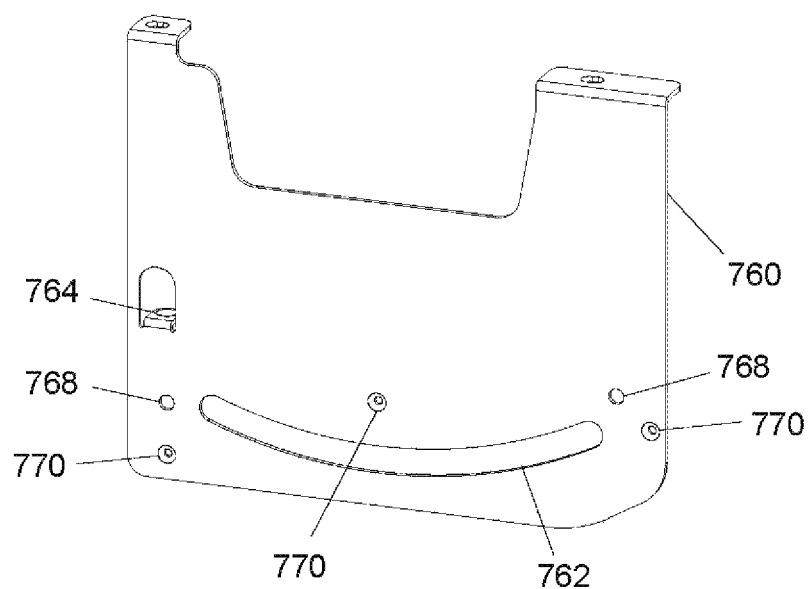
FIG. 63 shows the tilt plate of FIG. 62 isolated.

FIG. 62 shows a tilt plate 760 installed in table saw 10, and FIG. 63 shows tilt plate 760 isolated. Tilt plate 760 attaches to the underside of table 12 near the front of the saw via two screws, one on the left side of the front trunnion mounting plate and one on the right side of the front trunnion bracket. FIG. 18 shows tilt plate 760 through hole 24 in saw housing 22. Tilt plate 760 is formed from a unitary piece of bent sheet metal, shaped generally like a rectangle with a section cut out of the middle at the top. A generally horizontally oriented arcuate opening 762 is disposed towards the bottom of the tilt plate, through which the tilt lock lever passes, as will be discussed later. Tilt plate 760 also includes a tab 764 to which a ground wire can be connected in order to provide a reference ground for the saw. Two holes 768 are used to attach stops to tilt plate 760 in order to limit the travel of trunnion 32 to a range of 45 degrees as it tilts. Three screws pass through three holes 770 in tilt plate 760 to attach the tilt plate to saw housing 22. Tilt plate 760 is thus held flush with the back side of the front of saw housing 22.

Below arcuate opening 24 in saw housing 22, there is a second arcuate opening 26, also shown in FIGS. 5 and 18. Elevation control shaft 510 passes through arcuate opening 26, as stated previously.

Figure 64:
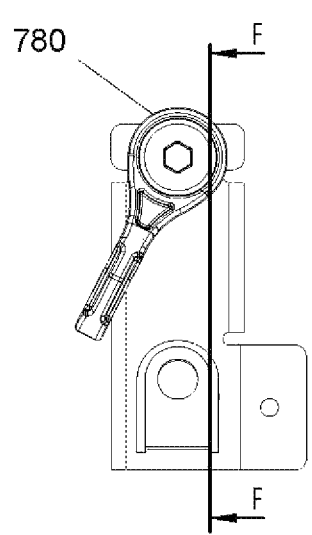
FIG. 64 shows the tilt lock lever and elevation shaft bracket of the tilt mechanism of FIG. 62 isolated.
Figure 65:
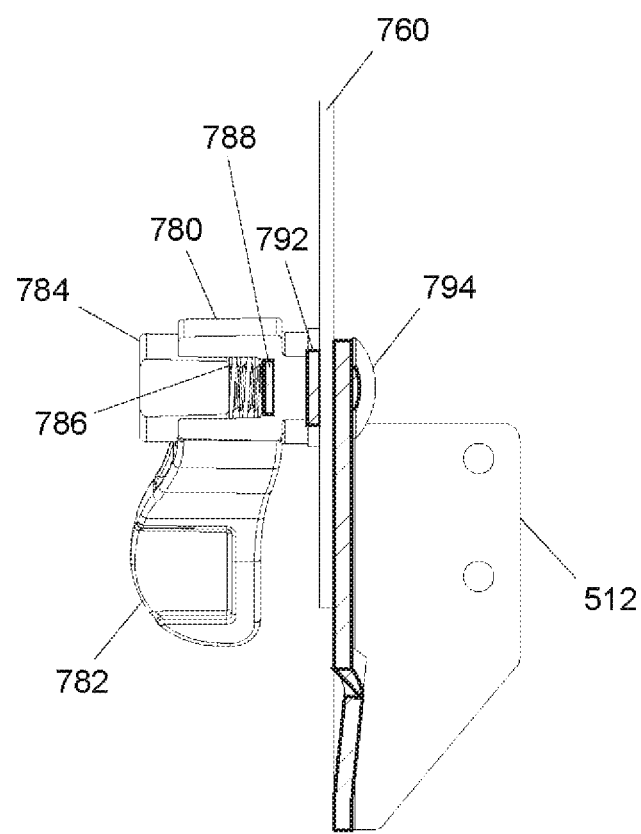
FIG. 65 shows a cross-sectional view of the tilt lock lever and elevation shaft bracket of FIG. 64, taken along the line F-F in FIG. 64, with a tilt plate added.

A tilt lock handle 780 is shown in FIGS. 64 and 65. FIG. 65 shows a cross sectional view of the tilt lock handle 780 and elevation control shaft bracket 512 along the line F-F—in FIG. 64, with tilt plate 760 added. A carriage bolt 794 in tilt lock handle 780 passes through a square hole 514 near the top of elevation control shaft bracket 512 (labeled in FIGS. 35 and 36). A washer 792, a nut (not shown), washer 788, spring 786, handle 782, and tilt lock handle cap 784 are then arranged on bolt 794 as shown in FIG. 65. Tilt plate 760, which is shown in FIG. 65 but not shown in FIG. 64, fits between washer 792 and elevation control shaft bracket 512. Bolt 794 passes through arcuate opening 762 in tilt plate 760, such that the head of bolt 794 and elevation control shaft bracket 512 are behind tilt plate 760, and tilt lock handle 780 is in front of tilt plate 760 and accessible to a user.

In order to tilt the trunnion and accompanying internal saw components, a user would first turn handle 782 to the left (clockwise as seen in FIG. 64) around an axis defined by bolt 794. Since spring 786 serves to bias washer 788, handle 782, and tilt lock handle cap 784 away from elevation control shaft bracket 512, the clamping force on tilt plate 760 would be removed when handle 782 is turned to the left. A user would then use hand wheel 34 and/or tilt lock handle 780 to tilt the trunnion to a desired angle relative to the table, with bolt 794 travelling along arcuate opening 762 in tilt plate 760 and the accompanying opening 24 in saw housing 22, and elevation control shaft 510 travelling along arcuate opening 26 in saw housing 22. A user would then turn handle 782 to the right (counterclockwise as seen in FIG. 64) around bolt 794 in order to clamp against tilt plate 760 and prevent further movement of the trunnion and blade.

Between arcuate openings 24 and 26 in saw housing 22, there is an arcuate bevel tilt ruler 800, shown in FIG. 18. A user can use bevel gauge 540 and tilt ruler 800 to ascertain the angle of the trunnion and blade relative to the work surface.

Figure 66:
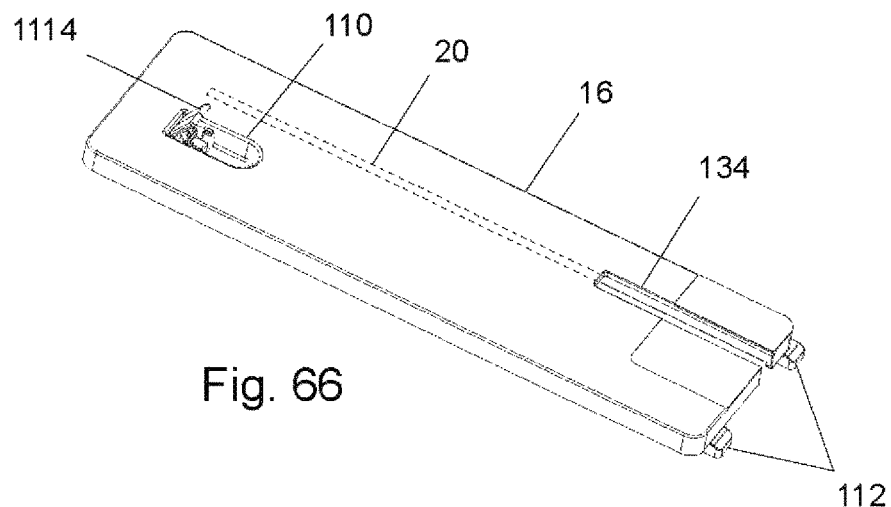
FIG. 66 shows an alternative table insert and accompanying hold-down mechanism.
Figure 67:
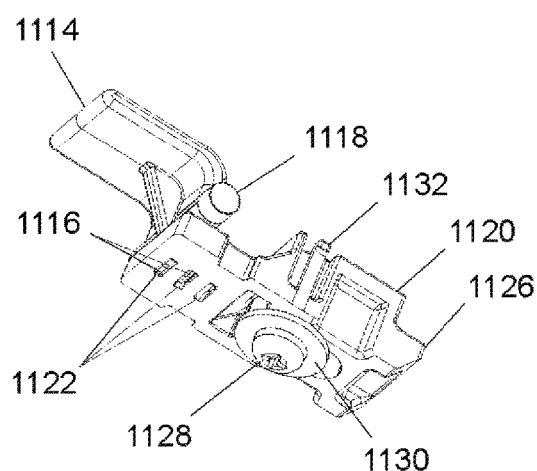
FIG. 67 shows an isometric bottom view of the hold-down mechanism of FIG. 66 isolated.
Figure 68:
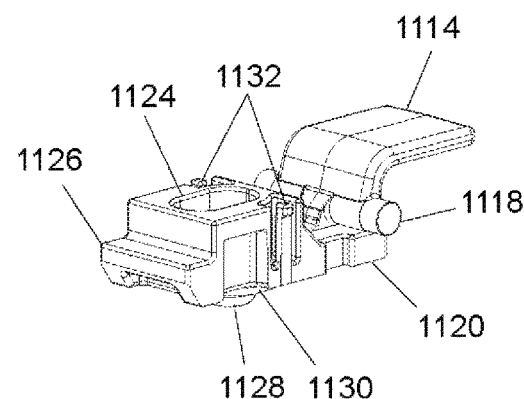
FIG. 68 shows a perspective top view of the hold-down mechanism of FIG. 66 isolated.
Figure 69:
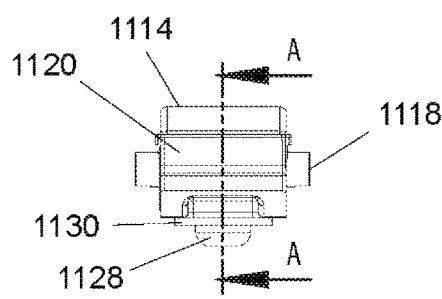
FIG. 69 shows a front view of the hold-down mechanism of FIG. 66 isolated.
Figure 70:
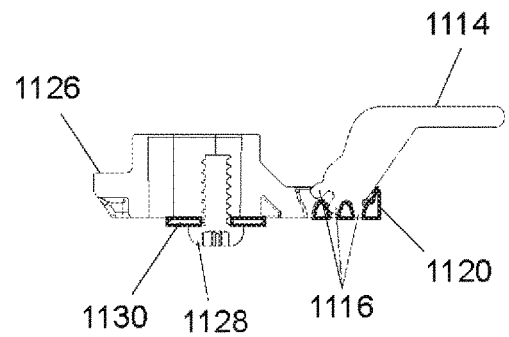
FIG. 70 shows a cross-sectional side view of the hold-down mechanism of FIG. 66 isolated, taken along the line A-A in FIG. 69.

FIGS. 66 through 71 show an alternate exemplary embodiment of the insert hold-down mechanism shown in FIGS. 8 and 9. FIG. 66 shows the top of insert 16 with the alternate hold-down mechanism installed therein. As disclosed previously, insert 16 includes an indentation 110, slot 20, opening 134, and tabs 112 that contact the underside of the saw table. A finger lever 1114 is configured to be pulled toward the front of the saw to release the insert from the blade opening. Finger lever 1114 is shown actuated to release the insert (angled up) in FIG. 66, and un-actuated to secure the insert (generally horizontal) in FIGS. 67 through 70. FIGS. 67 through 70 show the hold-down mechanism isolated from insert 16. Finger lever 1114 bends down and becomes a plurality of lock teeth 1116, and a dowel portion 1118 is interposed between lever portion 1114 and lock teeth 1116. Lock teeth 1116 fit into a plurality of generally rectangular openings 1122 in a lock block 1120. Lock block 1120 is connected to the bottom of insert 16 by a screw 1128, which passes through a washer 1130 and into a portion of insert 16 which extends down into an elongated opening 1124 in lock block 1120, as shown in FIGS. 67 through 71. The downward extension of insert 16 allows for translation of lock block 1120 in the forward and backward directions, but not sideways or vertically.

Figure 71:
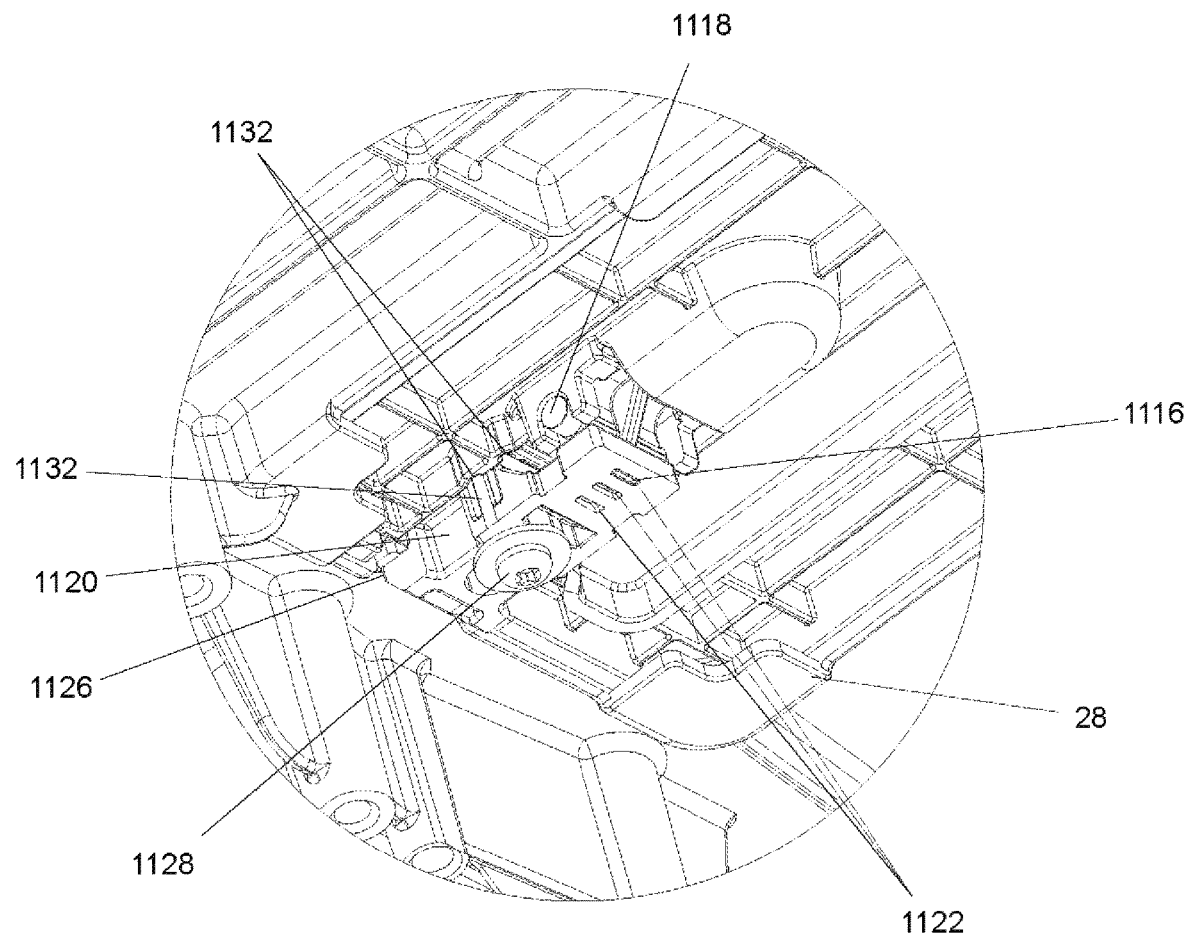
FIG. 71 shows a detail view of the table insert and hold-down mechanism of FIG. 66 installed in the table saw of FIG. 1.

When finger lever 1114 is pushed down into indentation 110, lock teeth 1116 push lock block 1120 toward the front of the saw, and front edge 1126 of said lock block 1120 overlaps with a corresponding ledge on table 12, as shown in FIG. 71. Lock teeth 1116 engage with rectangular openings 1122 in lock block 1120 and function like a rack and pin gear to move lock block 1120 forward and backward. The interaction between lock teeth 1116 and lock block 1120 can be seen in FIG. 70, which shows a cross section of FIG. 69 along the line A-A in FIG. 69. This prevents the front of insert 16 from rising up during use. In order to remove the insert, a user would place a finger into indentation 110 and pull finger lever 114 up toward the front of the saw. This would cause front edge 126 to retract and cease to be in contact with table 12. The user could then lift the front of insert 16 out of opening 14, slide tabs 112 out of contact with the table, and remove the insert from opening 14.

The hold-down mechanism depicted in FIGS. 66 through 71 includes a two position detent 1132 on each side of lock block 1120. The detents fit into two indentations 1134 on each side of insert 16, two of which are labeled in FIG. 71. The engagement between the detents 1132 on lock block 1120 and indentations 1134 in insert 16 prevents the hold-down mechanism from moving unexpectedly between the locked and unlocked positions.

INDUSTRIAL APPLICABILITY

The power saws described herein are applicable to woodworking, manufacturing, packaging, construction, carpentry, material processing, etc. Various disclosed features are particularly relevant to table saws. Various other disclosed features are particularly relevant to table saws, hand-held circular saws, track saws, miter saws, and band saws with active injury mitigation technology.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A saw comprising:
a table with an opening;
a substantially planar, circular blade configured to extend at least partially above the table through the opening;
a motor to move the blade;
a trunnion to support the motor and blade; and
first and second trunnion brackets attached to the table and connected to the trunnion so that the trunnion hangs from the first and second trunnion brackets;
where the trunnion comprises a piece of hollow tubing bent into a predetermined shape, where the tubing has first and second ends, where the first end connects to the first trunnion bracket and the second end connects to the second trunnion bracket; and
where the trunnion is configured to tilt relative to the table.

2. The saw of claim 1, where the table has a front edge and a rear edge, and where the first trunnion bracket is attached to the table between the front edge and the opening, and the second trunnion bracket is attached to the table between the rear edge and the opening.

3. The saw of claim 1, further comprising first and second mounting plates, and where the first end of the trunnion connects to the first trunnion bracket through the first mounting plate, and where the second end of the trunnion connects to the second trunnion bracket through the second mounting plate.

4. The saw of claim 1, where the bent tube has a generally "U" shape.

5. The saw of claim 1, where the bent tube has a generally rectangular cross-section.

6. The saw of claim 1, where the bent tube has at least two bends.

7. The saw of claim 6, where the bent tube has a bottom section between the two bends, and where the bottom section is sloped relative to the table.

8. The saw of claim 1, where the bent tube has a bend and where the bend in the tube creates a corner.

9. The saw of claim 8, further comprising an elevation mechanism, and where at least part of the elevation mechanism is mounted on the bent tube adjacent the corner.

10. A saw comprising:
a table with an opening;
a substantially planar, circular blade configured to extend at least partially above the table through the opening;
a motor to move the blade;
first and second trunnion brackets attached to the table; and
a trunnion to support the motor and blade, where the trunnion comprises a piece of hollow tubing bent with at least two bends to form a generally "U" shape, where the tube has first and second ends, the first end being connected to the first trunnion bracket and the second end being connected to the second trunnion bracket, and where the trunnion is configured to tilt relative to the table.

* * * * *